(12) United States Patent
Jiang et al.

(10) Patent No.: US 11,049,254 B2
(45) Date of Patent: *Jun. 29, 2021

(54) METHODS AND SYSTEMS FOR IMAGE PROCESSING

(71) Applicant: SHANGHAI UNITED IMAGING HEALTHCARE CO., LTD., Shanghai (CN)

(72) Inventors: Chunhua Jiang, Shanghai (CN); Haihua Zhou, Shanghai (CN); Le Yang, Shanghai (CN); Hao Chen, Shanghai (CN); Wanli Teng, Shanghai (CN); Yueyan Bian, Shanghai (CN); Na Zhang, Shanghai (CN); Jing Yan, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,119

(22) Filed: May 13, 2019

(65) Prior Publication Data

US 2019/0333223 A1    Oct. 31, 2019

Related U.S. Application Data

(63) Continuation of application No. 15/638,327, filed on Jun. 29, 2017, now Pat. No. 10,290,108, which is a
(Continued)

(30) Foreign Application Priority Data

Dec. 31, 2015 (CN) .......................... 201511027173.3
Dec. 31, 2015 (CN) .......................... 201511027401.7
(Continued)

(51) Int. Cl.
*G06T 7/11* (2017.01)
*G06T 5/00* (2006.01)
(Continued)

(52) U.S. Cl.
CPC ................. *G06T 7/11* (2017.01); *G06T 5/002* (2013.01); *G06T 5/007* (2013.01); *G06T 5/10* (2013.01);
(Continued)

(58) Field of Classification Search
CPC ......... G06T 11/005; G06T 2207/20012; G06T 2207/20064; G06T 2207/30004;
(Continued)

(56) References Cited

U.S. PATENT DOCUMENTS 5,572,565 A    11/1996    Abdel-Mottaleb
8,285,076 B2   10/2012    Panetta et al.
(Continued)

FOREIGN PATENT DOCUMENTS

CN    1489111 A    4/2004
CN    1744688 A    3/2006
(Continued)

OTHER PUBLICATIONS

International Search Report in PCT/CN2016/113079 dated Apr. 1, 2017, 4 pages.
(Continued)

*Primary Examiner* — Ian L Lemieux
(74) *Attorney, Agent, or Firm* — Metis IP LLC

(57) ABSTRACT

Methods and systems for image processing are provided. A target image may be acquired, wherein the target image may include a plurality of elements, an element of which may correspond to a pixel or a voxel. The target image may be decomposed into at least one layer, wherein the at least one layer may include a low frequency sub-image and a high
(Continued)

frequency sub-image. The at least one layer may be transformed. The transformed layer may be reconstructed into a composite image.

20 Claims, 13 Drawing Sheets

Related U.S. Application Data continuation of application No. PCT/CN2016/113079, filed on Dec. 29, 2016.

(30) Foreign Application Priority Data

Jul. 1, 2016 (CN) .......................... 201610510790.7
Jul. 22, 2016 (CN) .......................... 201610584749.4

(51) Int. Cl.
*G06T 7/12* (2017.01)
*G06T 5/10* (2006.01)
*G06T 5/50* (2006.01)
*G06T 11/00* (2006.01)

(52) U.S. Cl.
CPC .................. *G06T 5/50* (2013.01); *G06T 7/12* (2017.01); *G06T 11/005* (2013.01); *G06T 2207/20012* (2013.01); *G06T 2207/20064* (2013.01); *G06T 2207/30004* (2013.01); *G06T 2207/30068* (2013.01); *G06T 2211/424* (2013.01)

(58) Field of Classification Search
CPC ..... G06T 2207/30068; G06T 2211/424; G06T 5/002; G06T 5/007; G06T 5/10; G06T 5/50; G06T 7/11; G06T 7/12
See application file for complete search history.

(56) References Cited

U.S. PATENT DOCUMENTS

| | | | |
|---|---|---|---|
| 8,428,324 | B2 | 4/2013 | Heinlein et al. |
| 8,605,970 | B2 | 12/2013 | Bar-Aviv et al. |
| 9,002,134 | B2 | 4/2015 | Knapp et al. |
| 2006/0291742 | A1 | 12/2006 | Zhang et al. |
| 2008/0199100 | A1 | 8/2008 | Ishiga |
| 2009/0185733 | A1 | 7/2009 | Heinlein et al. |
| 2010/0046822 | A1 | 2/2010 | Li et al. |
| 2010/0142790 | A1 | 6/2010 | Chang |
| 2010/0266189 | A1 | 10/2010 | Knapp et al. |
| 2010/0272340 | A1 | 10/2010 | Bar-Aviv et al. |
| 2012/0035478 | A1 | 2/2012 | Nishihara et al. |
| 2013/0216117 | A1 | 8/2013 | Mercuriev |
| 2013/0243279 | A1 | 9/2013 | Zhang et al. |
| 2015/0193917 | A1 | 7/2015 | Schachter et al. |
| 2015/0235621 | A1 | 8/2015 | Hao et al. |
| 2016/0364840 | A1 | 12/2016 | Zhang |
| 2019/0318463 | A1* | 10/2019 | Zhang ................ G06T 5/10 |

FOREIGN PATENT DOCUMENTS

| | | | |
|---|---|---|---|
| CN | 101030298 | A | 9/2007 |
| CN | 101201937 | A | 6/2008 |
| CN | 101211459 | A | 7/2008 |
| CN | 101212560 | A | 7/2008 |
| CN | 101308566 | A | 11/2008 |
| CN | 101609549 | A | 12/2009 |
| CN | 101739671 | A | 6/2010 |
| CN | 101944230 | A | 1/2011 |
| CN | 101968883 | A | 2/2011 |
| CN | 102156963 | A | 8/2011 |
| CN | 102254305 | A | 11/2011 |
| CN | 102324021 | A | 1/2012 |
| CN | 103049898 | A | 4/2013 |
| CN | 103077510 | A | 5/2013 |
| CN | 103606136 | A | 2/2014 |
| CN | 104268840 | A | 1/2015 |
| CN | 104367316 | A | 2/2015 |
| CN | 104574361 | A | 4/2015 |
| CN | 104615877 | A | 5/2015 |
| CN | 104616255 | A | 5/2015 |
| CN | 104899849 | A | 9/2015 |
| CN | 105225210 | A | 1/2016 |
| CN | 105678750 | A | 6/2016 |
| CN | 105701796 | A | 6/2016 |
| CN | 105931201 | A | 9/2016 |
| CN | 106127712 | A | 11/2016 |
| CN | 106228520 | A | 12/2016 |
| KR | 20090055403 | A | 6/2009 |
| WO | WO-2009110260 | A1 * | 9/2009 ........... G06T 7/0012 |
| WO | 2014066364 | A1 | 5/2014 |

OTHER PUBLICATIONS

Written Opinion in PCT/CN2016/113079 dated Apr. 1, 2017, 5 pages.
Examination Report in Russian Application No. 2018127759 dated Apr. 10, 2019, 6 pages.
Extended European Search Report in European Application No. 16881262.6 dated Oct. 26, 2018, 7 pages.
First Office Action in Chinese Appiication No. 201511027173.3 dated Dec. 1, 2017, 13 pages.
First Office Action in Chinese Appiication No. 201610510790.7 dated May 3, 2018, 11 pages.
First Office Action in Chinese Application No. 201610584749.4 dated May 28, 2018, 11 pages.
First Office Action in Chinese Appiication No. 201511027401.7 dated Nov. 24, 2017, 8 pages.

* cited by examiner

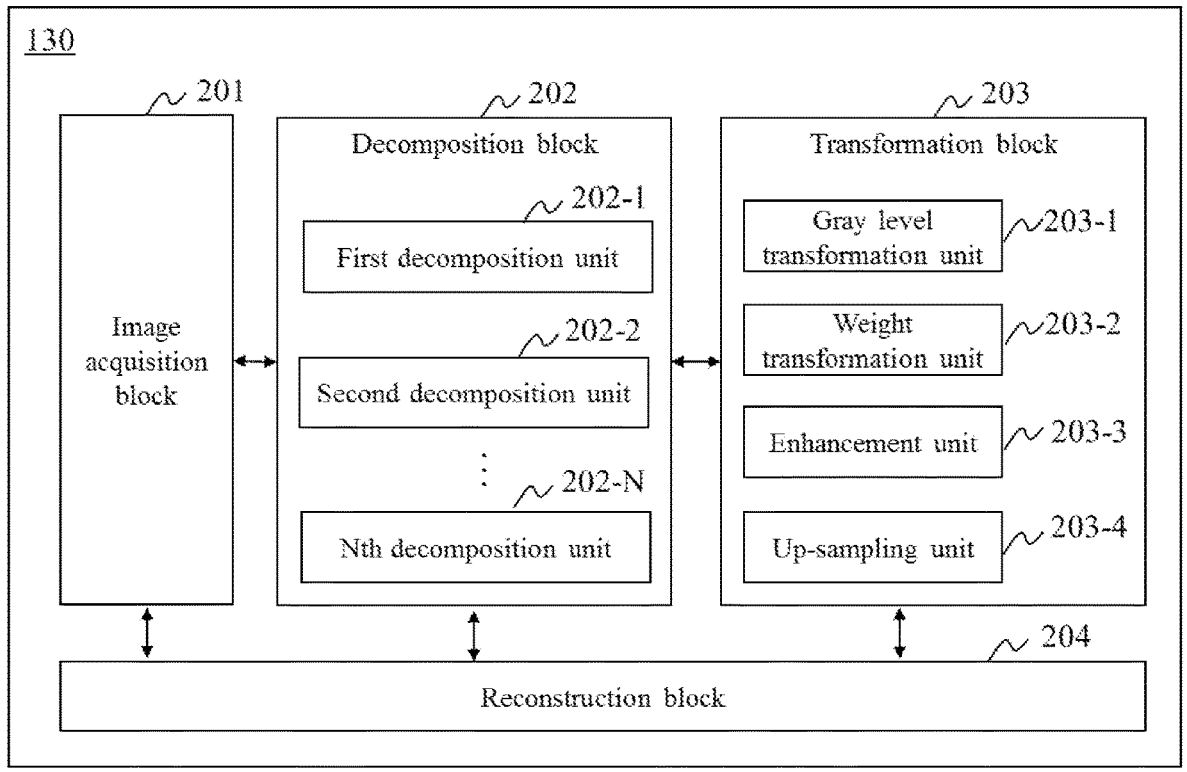
FIG. 2-A
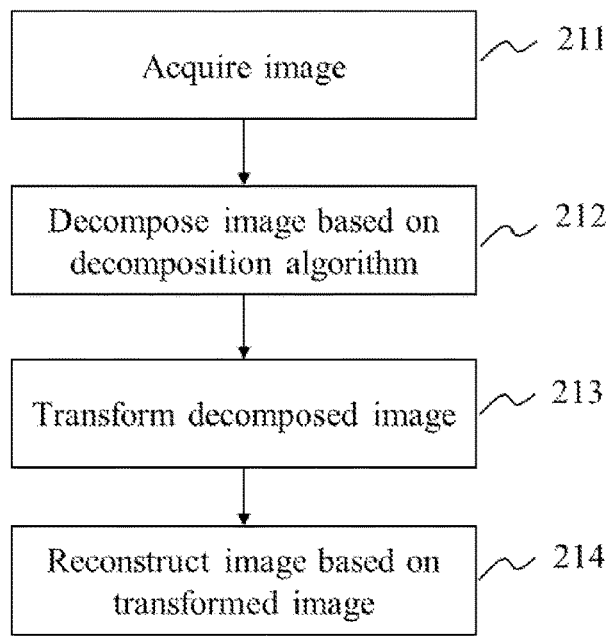
FIG. 2-B

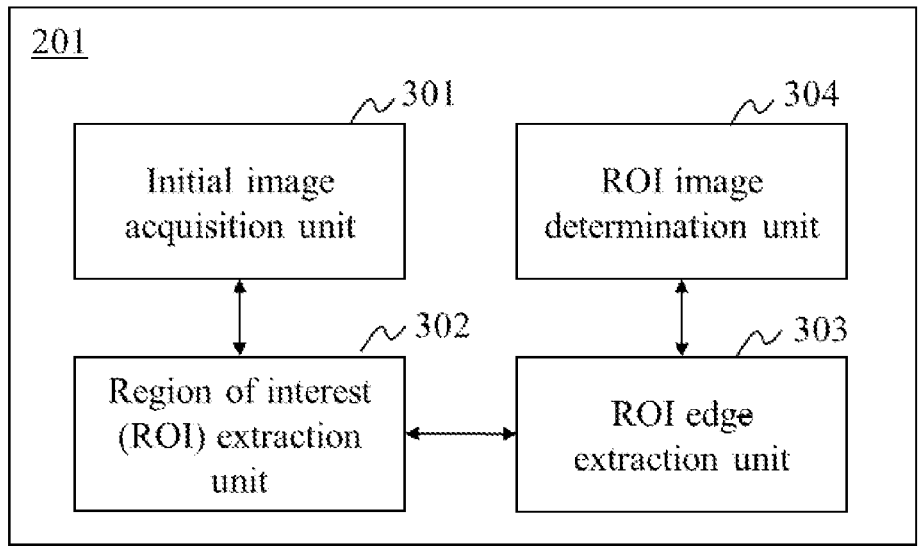
FIG. 3-A
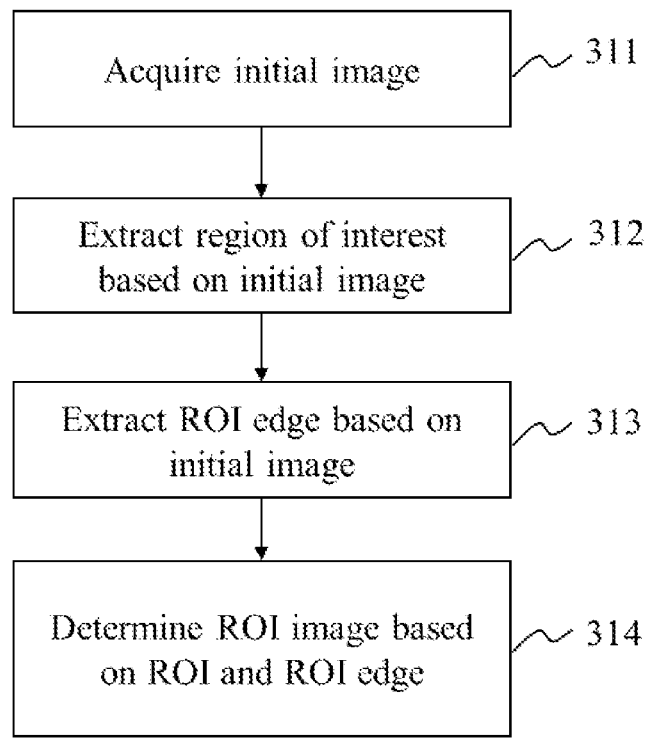
FIG. 3-B

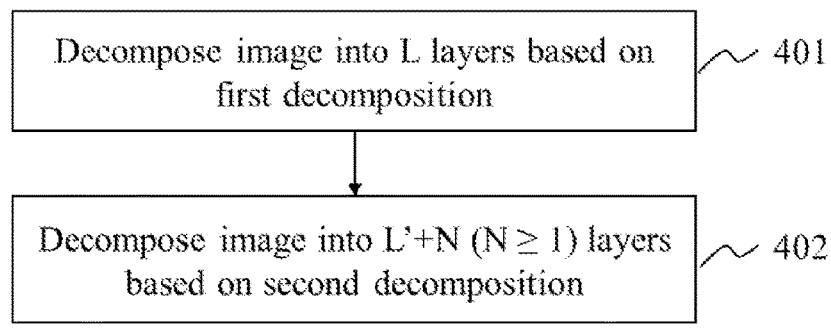
FIG. 4-A
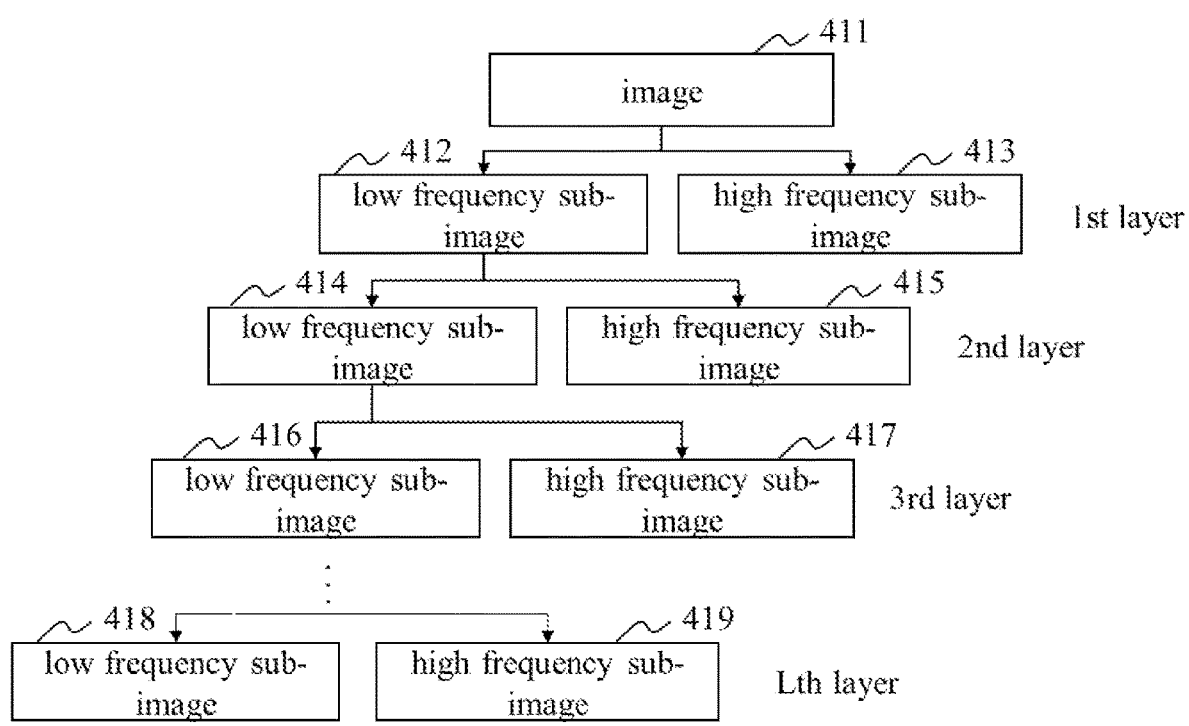
FIG. 4-B

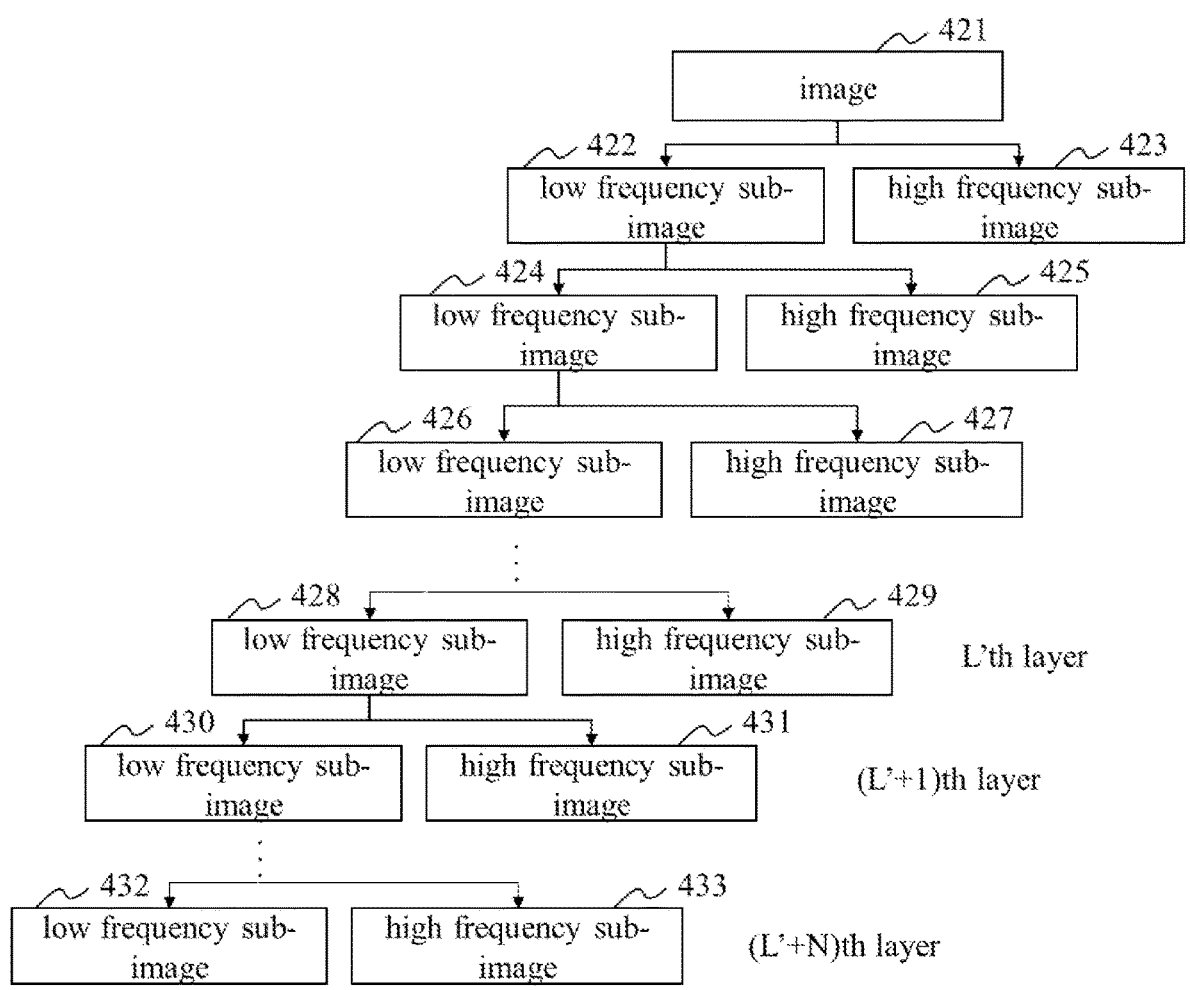
FIG. 4-C

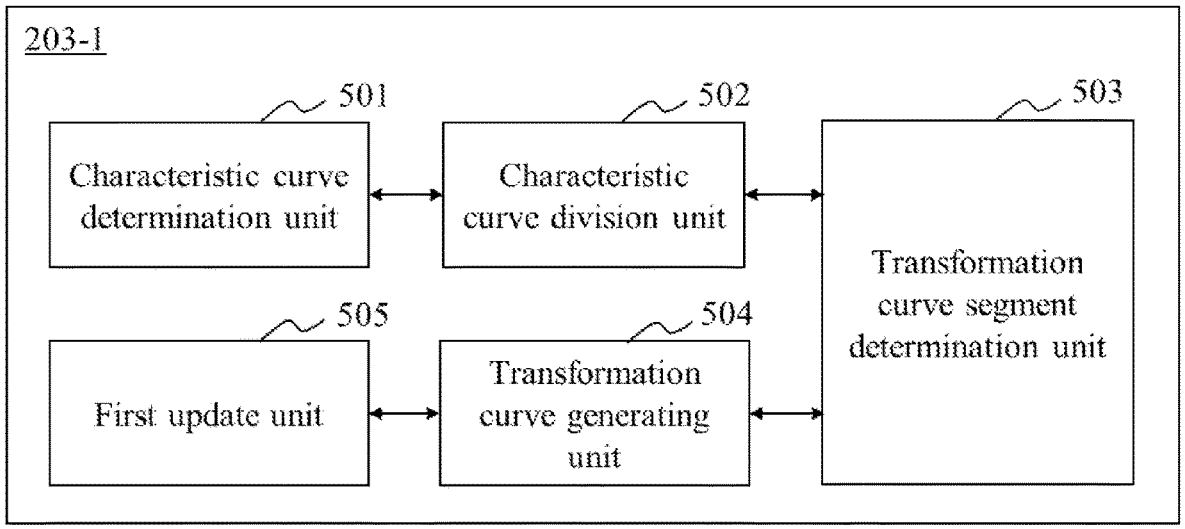
FIG. 5-A
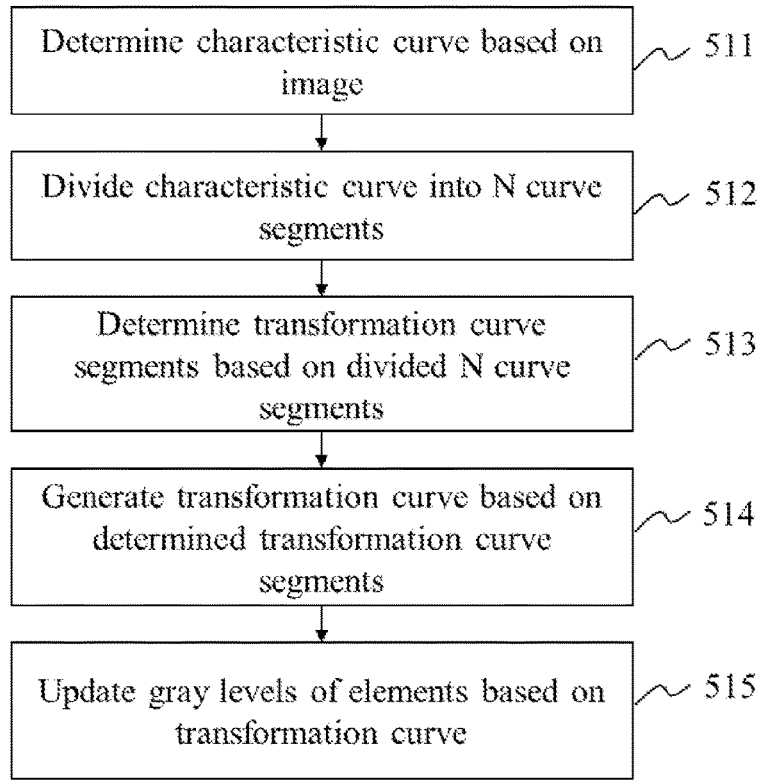
FIG. 5-B

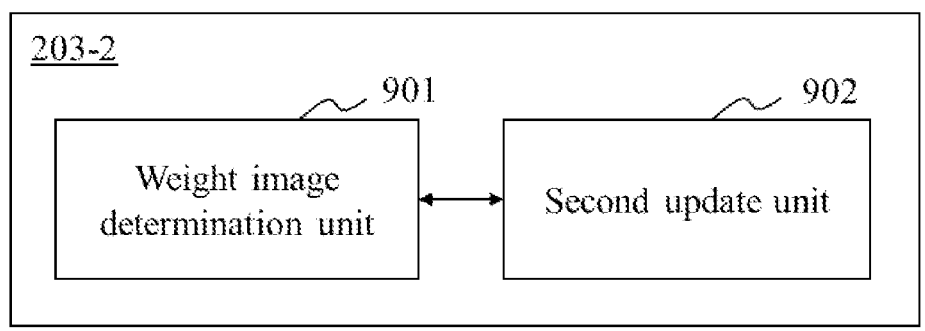
FIG. 9-A
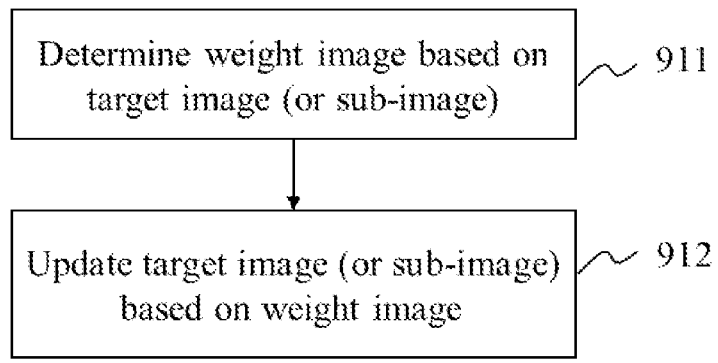
FIG. 9-B

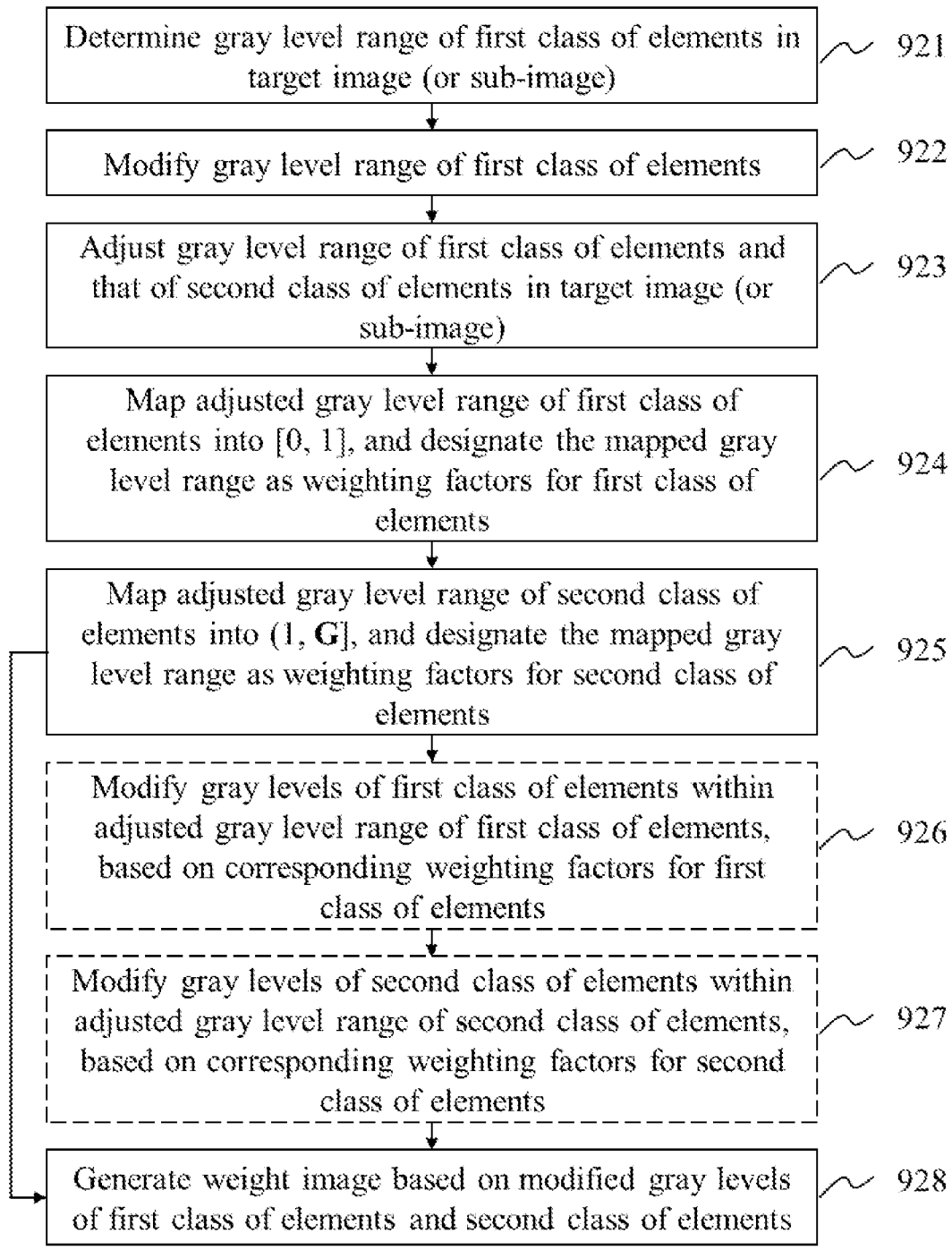
FIG. 9-C

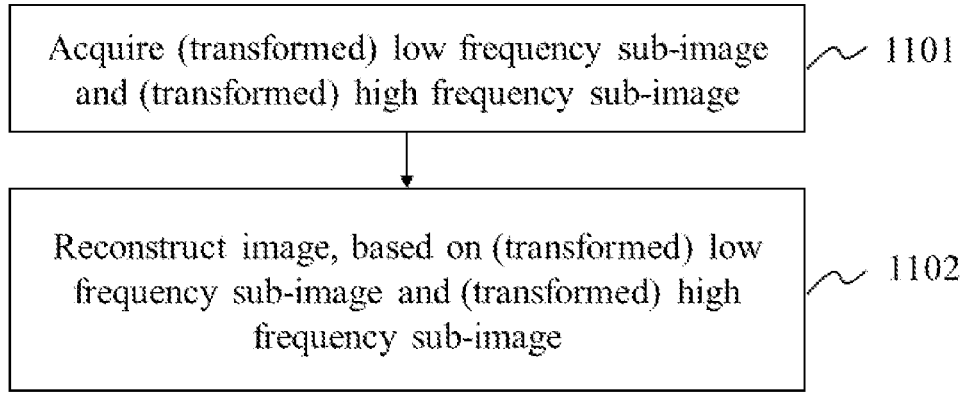
FIG. 11-A
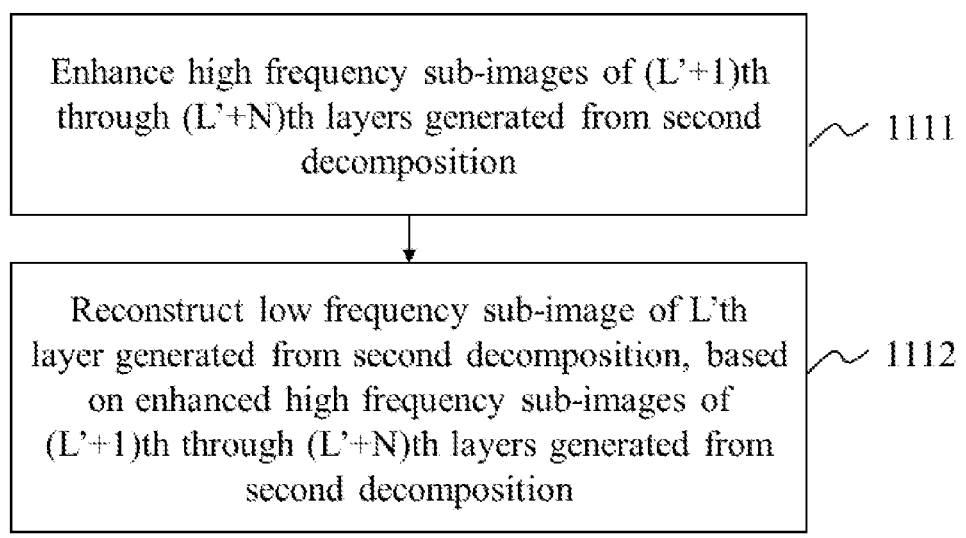
FIG. 11-B

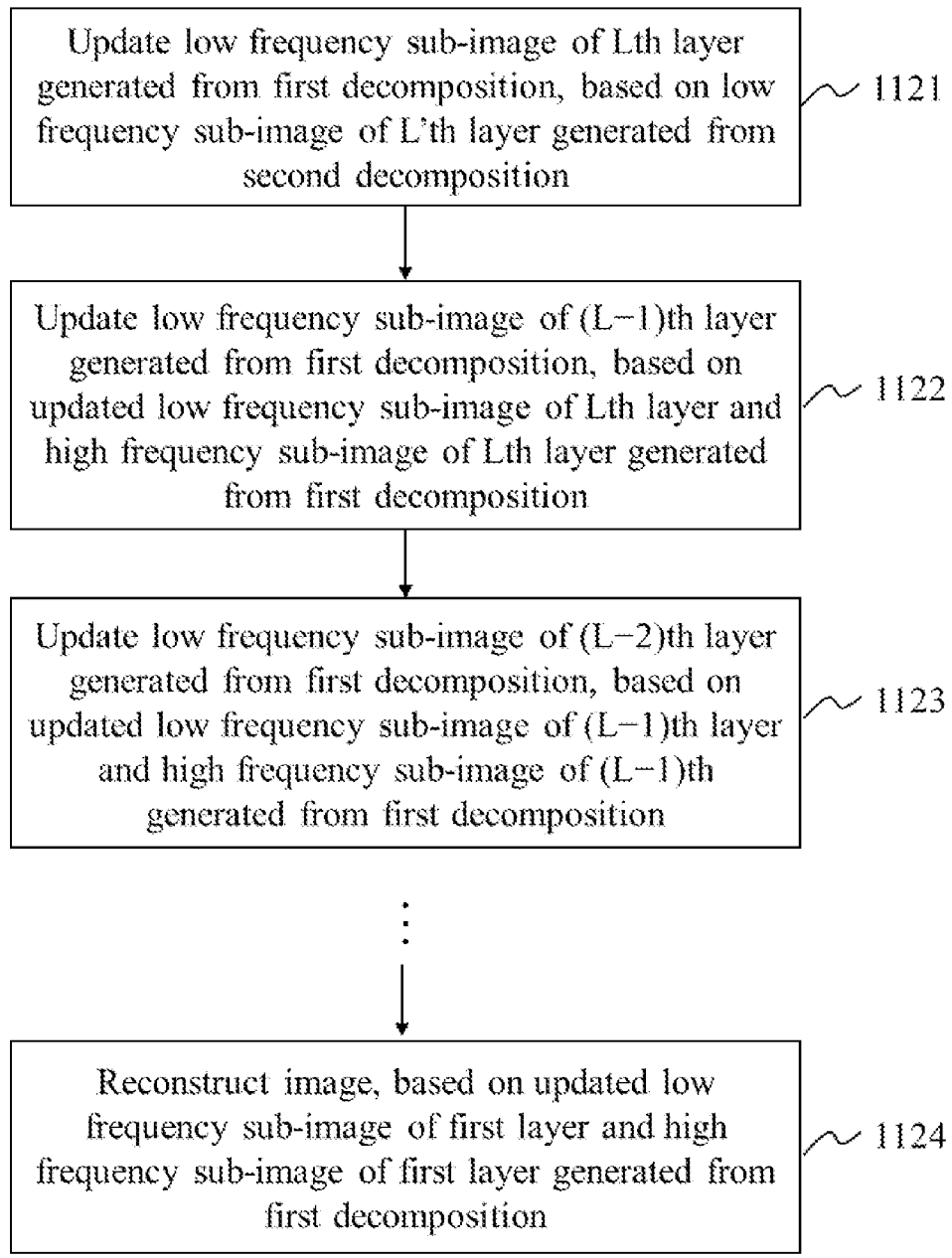
FIG. 11-C

METHODS AND SYSTEMS FOR IMAGE PROCESSING

CROSS-REFERENCE TO RELATED APPLICATIONS

This application is a continuation of U.S. application Ser. No. 15/638,327, filed on Jun. 29, 2017, which is a continuation of International Application No. PCT/CN2016/113079, filed on Dec. 29, 2016, which in turn claims priority of Chinese Patent Application No. 201511027401.7, filed on Dec. 31, 2015, Chinese Patent Application No. 201511027173.3, filed on Dec. 31, 2015, Chinese Patent Application No. 201610510790.7, filed on Jul. 1, 2016, and Chinese Patent Application No. 201610584749.4, filed on Jul. 22, 2016, the contents of each of which are hereby incorporated by reference.

TECHNICAL FIELD

The present disclosure generally relates to image processing, more specifically relates to methods and systems for enhancing an image.

BACKGROUND

An imaging system may play a significant role in the medical filed. An imaging system may generate and/or process a medical image (e.g., a CT image, a PET image, an MRI image, etc.) for medical diagnose or radioactive therapy. For instance, a CT image of a breast may be used to screen a lump in the breast. Usually, a medical image may be adjusted, in order to facilitate a doctor to identify a potential lesion. For instance, the image may be denoised and/or enhanced by different techniques of image processing. However, the adjustment for the image may be inefficient and/or ineffective. For instance, an edge of a region of interest may be missed; gray levels in the image may be uneven; or imaging noise may be enhanced. Hence, image processing technique(s) that may enhance a contrast of the image and/or denoise the image, may be desirous for the imaging system.

SUMMARY

One aspect of the present disclosure relates to a method for image processing. The method may be implemented on at least one machine, each of which may have at least one processor and storage. The method may include one or more of the following operations. A target image may be acquired, wherein the target image may include a plurality of elements, an element of which may correspond to a pixel or a voxel. The target image may be decomposed into at least one layer, wherein the at least one layer may include a low frequency sub-image and a high frequency sub-image. The at least one layer may be transformed. The transformed layer may be reconstructed into a composite image.

Another aspect of the present disclosure relates to a non-transitory computer readable medium including executable instructions. The instructions, when executed by at least one processor, may cause the at least one processor to effectuate a method for image processing.

A further aspect of the present disclosure relates to a system for image processing. The system may include at least one processor and instructions. The instructions, when executed by the at least one processor, may perform a method for image processing. The system may further include a non-transitory computer readable medium including the instructions.

In some embodiments, the acquisition of a target image may include one or more of the following operations. An initial image may be acquired. A region of interest (ROI) may be extracted based on the initial image. An ROI edge may be extracted based on the initial image. An ROI image may be determined as the target image based on the ROI and the ROI edge.

In some embodiments, the ROI may be a breast. The ROI edge may be a breast edge. The target image may be a breast image.

In some embodiments, the extraction of an ROI edge may include one or more of the following operations. The initial image may be denoised. The denoised initial image may be pre-processed based on a gradient transform. The ROI edge may be detected.

In some embodiments, the detection of the ROI edge may include one or more of the following operations. The ROI edge may be detected based on an OTSU algorithm or an iterative algorithm.

In some embodiments, the extraction of an ROI may include one or more of the following operations. The ROI may be segmented based on an OTSU algorithm or a watershed algorithm.

In some embodiments, the method may further include one or more of the following operations. The initial image may be transformed into a log-domain image.

In some embodiments, the low frequency sub-image may include a predetermined region including a plurality of gray levels, and the transformation of the layer may include one or more of the following operations. The plurality of gray levels of the predetermined region may be transformed.

In some embodiments, the transformation of the plurality of gray levels of the predetermined region may include one or more of the following operations. A reference edge in the low frequency sub-image may be determined. A characteristic curve may be determined based on the low frequency sub-image. The characteristic curve may illustrate the relationship between a distance and a gray level corresponding to the distance, wherein the distance may be a distance between a first element in the low frequency sub-image and a second element in the reference edge, and the first element may correspond to the second element. The gray level may be determined based on the plurality of gray levels. A transformation curve may be determined based on the characteristic curve, wherein the transformation curve may illustrate the relationship between the gray level before transformation and the gray level after transformation. The plurality of gray levels of the predetermined region may be updated based on the transformation curve.

In some embodiments, the determination of a transformation curve may include one or more of the following operations. The characteristic curve may be divided into N characteristic curve segments. N transformation curve segments may be determined based on the N characteristic curve segments, wherein a characteristic curve segment may correspond to a transformation curve segment. The transformation curve may be generated based on the N transformation curve segments.

In some embodiments, the determination of N transformation curve segments may include one or more of the following operations. For an xth transformation curve segment of the N transformation curve segments, a slope of the xth transformation curve segment may be calculated based on the gray level of a predetermined point in the characteristic curve, a gray level of the starting point of an xth characteristic curve segment, and a gray level of the end point of the xth characteristic curve segment. The xth characteristic curve segment may correspond to the xth transformation curve segment, wherein x may be an integer, $1 \leq x \leq N$. The determination of a gray level of the starting point in the xth transformation curve segment may include one or more of the following operations. If $x=1$, the gray level of the starting point in the xth characteristic curve segment may be designated as the gray level of the starting point in the xth transformation curve segment. If $1 < x \leq N$, the gray level of the starting point in the xth transformation curve segment may be determined based on the gray level of the starting point of the (x−1)th transformation curve segment and a gray level variation of the (x−1)th characteristic curve segment.

In some embodiments, the determination of a transformation curve may further include one or more of the following operations. A gray level range of the characteristic curve may be determined, wherein the gray level range may be a range within which at least one gray level is to be transformed, and the gray level range may correspond to a portion of the characteristic curve. The maximum value or minimum value of the gray level range may be designated as the gray level of the predetermined point in the characteristic curve.

In some embodiments, the decomposition of the target image may include one or more of the following operations. The target image may be decomposed into L layers based on a first decomposition, wherein each layer of the L layers may include a low frequency sub-image and a high frequency sub-image, $L \geq 1$. The target image may be decomposed into $L'+N$ image layers based on a second decomposition, wherein each layer of the $L'+N$ layers may include a low frequency sub-image and a high frequency sub-image, $L' \geq 1$, and $N \geq 1$.

In some embodiments, L may be equal to L'.

In some embodiments, the first decomposition may be Laplace transform, and the second decomposition may be wavelet transform.

In some embodiments, the reconstruction of the transformed layer may include one or more of the following operations. The low frequency sub-image of the Lth layer generated from the first decomposition may be updated, based on the low frequency sub-image of the L'th layer generated from the second decomposition. The composite image may be reconstructed, based on the high frequency sub-images of the L layers generated by the first decomposition and the updated low frequency sub-image of the Lth layer.

In some embodiments, the method may further include one or more of the following operations. The high frequency sub-images of the L layers generated by the first decomposition may be enhanced.

In some embodiments, the reconstruction of the composite image may include one or more of the following operations. For each of a plurality of iterations, the low frequency sub-image of the (L−i)th layer may be up-sampled. For each of a plurality of iterations, the low frequency sub-image of the (L−i−1)th layer may be updated, based on the up-sampled low frequency sub-image of the (L−i)th layer and the high frequency sub-image of the (L−i)th layer, $0 \leq i \leq L-1$. For each of a plurality of iterations, the composite image may be reconstructed, based on the updated low frequency sub-image of the first layer and the high frequency sub-image of the first layer.

In some embodiments, the up-sampling of the low frequency sub-image of the (L−i)th layer may include one or more of the following operations. The low frequency sub-image of the (L−i)th layer may be up-sampled, based on a bilinear interpolation or a cubic interpolation.

In some embodiments, the method may further include one or more of the following operations. The low frequency sub-image of the L'th layer generated by the second decomposition may be updated, based on the low frequency sub-image of the (L'+N)th layer generated by the second decomposition and the high frequency sub-images of the (L'+1)th layer through the (L'+N)th layer generated from the second decomposition.

In some embodiments, the high frequency sub-image may include a plurality of elements, and the transformation of the layer may include one or more of the following operations. A weight image for the high frequency sub-image may be generated, wherein the weight image may include a plurality of weights corresponding to the plurality of elements. The high frequency sub-image may be updated, based on the weight image.

In some embodiments, the high frequency sub-image may include a first class of elements and a second class of elements, and the generation of the weight image may include one or more of the following operations. A gray level range of the first class of elements may be determined in the high frequency sub-image. A gray level range of the second class of elements may be determined in the high frequency sub-image, based on the gray level range of the first class of elements. The gray level range of the first class of elements may be mapped into [0, 1]. Weighting factors for the first class of elements may be determined, based on the mapped gray level range of the first class of elements. The gray level range of the second class of elements may be mapped into (1, G], wherein G may be a predetermined value. Weighting factors for the second class of elements may be determined, based on the mapped gray level range of the second class of elements. The weight image may be generated, based on the weighting factors for the first class of elements and the weighting factors for the second class of elements.

In some embodiments, the determination of a gray level range of the first class of elements may include one or more of the following operations. An initial gray level range of the first class of elements may be determined, based on a gray level threshold. The initial gray level range of the first class of elements may be modified. The initial gray level range of the first class of elements may be adjusted, based on the modified gray level range of the first class of elements.

In some embodiments, the adjustment of the initial gray level range of the first class of elements may include one or more of the following operations. A first threshold may be calculated, based on the modified gray level range of the first class of elements. The gray level range of the first class of elements may be determined as [0, the first threshold].

In some embodiments, the transformation of the high frequency sub-image may include one or more of the following operations. The gray levels of the high frequency sub-image may be multiplied by that of the weight image.

In some embodiments, the transformation of the layer may include one or more of the following operations. The high frequency sub-image may be transformed by linear/nonlinear enhancement, or denoising.

In some embodiments, the transformation of the layer may include one or more of the following operations. The low frequency sub-image may be transformed by linear/nonlinear enhancement, or denoising.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2-A is a schematic diagram illustrating an exemplary image processing system according to some embodiments of the present disclosure;

FIG. 2-B is a flowchart of an exemplary process for processing an image according to some embodiments of the present disclosure;

FIG. 3-A is a schematic diagram illustrating an exemplary image acquisition block according to some embodiments of the present disclosure;

FIG. 3-B is a flowchart of an exemplary process for acquiring an image according to some embodiments of the present disclosure;

FIG. 4-A is a flowchart of an exemplary process for decomposing an image according to some embodiments of the present disclosure;

FIG. 4-B is a schematic diagram illustrating exemplary L layers decomposed by a first decomposition unit according to some embodiments of the present disclosure;

FIG. 4-C is a schematic diagram illustrating exemplary L'+N layers decomposed by a second decomposition unit according to some embodiments of the present disclosure;

FIG. 5-A is a schematic diagram illustrating an exemplary gray level transformation unit according to some embodiments of the present disclosure;

FIG. 5-B is a flowchart of an exemplary process for transforming an image according to some embodiments of the present disclosure;

FIG. 9-A is a schematic diagram illustrating an exemplary weight transformation unit according to some embodiments of the present disclosure;

FIG. 9-B is a flowchart illustrating an exemplary process for transforming a target image based on a weight image according to some embodiments of the present disclosure;

FIG. 9-C is a flowchart illustrating an exemplary process for determining a weight image according to some embodiments of the present disclosure;

FIG. 11-A is a flowchart of an exemplary process for reconstructing a composite image based on one layer according to some embodiments of the present disclosure;

FIG. 11-B is a flowchart of an exemplary process for reconstructing a low frequency sub-image of L'th layer generated from the second decomposition according to some embodiments of the present disclosure; and FIG. 11-C is a flowchart of an exemplary process for reconstructing a composite image based on L layers generated from the first decomposition according to some embodiments of the present disclosure.

DETAILED DESCRIPTION

Figure 1:
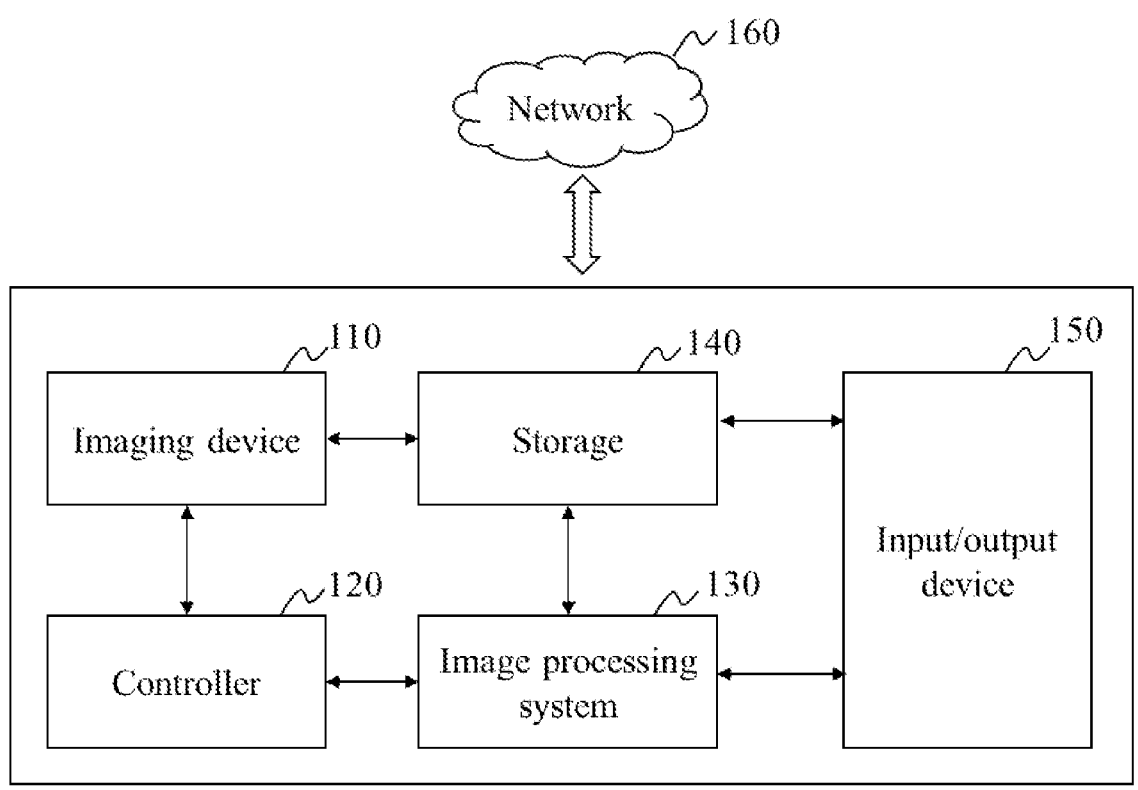
FIG. 1 is a schematic diagram illustrating an exemplary imaging system according to some embodiments of the present disclosure.

In the following detailed description, numerous specific details are set forth by way of example in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "module," and/or "unit" used herein are one method to distinguish different components, elements, parts, section or assembly of different level in ascending order. However, the terms may be displaced by other expression if they may achieve the same purpose.

It will be understood that when a device, unit, or module is referred to as being "on," "connected to/with," or "coupled to/with" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

For illustration purposes, the following description is provided to help better understanding of an image processing or enhancement method or system. It should be noted that "image" may refer to a medial image, a static picture, or a video frame. It is understood that this is not intended to limit the scope the present disclosure. For persons having ordinary skills in the art, a certain amount of variations, changes and/or modifications may be deducted under guidance of the present disclosure. Those variations, changes and/or modifications do not depart from the scope of the present disclosure.

FIG. 1 is a block diagram illustrating an exemplary imaging system according to some embodiments of the present disclosure. The imaging system may produce an image of an object. As illustrated, the imaging system may include an imaging device 110, a controller 120, an image processing system 130, a storage 140, and an input/output device 150.

The imaging device 110 may scan an object, and generate a plurality of data relating to the object. In some embodiments, the imaging device 110 may be a medical imaging device, for example, a PET device, a SPECT device, a CT device, an MRI device, an X-ray photography equipment (e.g., a full-field digital mammography (FFDM)), a digital breast tomosynthesis (DBT) equipment, a Digital Subtraction Angiography (DSA) system, a Magnetic Resonance Angiography (MRA) system, Computed Tomography Angiography (CTA), a Digital Radiography (DR) system, or the like, or any combination thereof (e.g., a PET-CT device, a PET-MRI device, or a SPECT-MRI device).

In some embodiments, the imaging device 110 may include a scanner to scan an object and obtain information related to the object. In some embodiments, the imaging device 110 may be a radioactive scanning device. The radioactive scanning device may include a radioactive source to emit radioactive rays to the object being scanned. The radioactive rays may include, for example, particle rays, photon rays, or the like, or any combination thereof. The particle rays may include neutron, proton, electron, a-ray, p-meson, heavy ion, or the like, or any combination thereof. The photon rays may include X-ray, y-ray, ultraviolet, laser, or the like, or any combination thereof.

In some embodiments, the photon ray may be X-ray, and the imaging device 110 may be a CT system, a digital radiography (DR) system, a multi-modality system, or the like, or any combination thereof. Exemplary multi-modality system may include a CT-PET system, a SPECT-MRI system, or the like. In some embodiments, the imaging device 110 may include an X-ray generating unit (not shown) and an X-ray detecting unit (not shown). In some embodiments, the imaging device 110 may include a photon detector to capture the photon generated from the object being scanned. In some embodiments, the photon detector may include a scintillator, and/or a photodetector, and the imaging device 110 may be a PET system, or a multi-modality system (e.g., a PET-CT system, a PET-MRI system, or the like). In some embodiments, the imaging device 110 may include a main magnetic field generator, a plurality of gradient coils, a radiofrequency (RF) transmitter, and/or an RF receiver. The imaging device 110 may be an MRI system, or a multi-modality system (e.g., a PET-MRI system, a SPECT-MRI system, or the like).

The controller 120 may control the imaging device 110, the image processing system 130, the storage 140, and/or the input/output device 150. The controller 120 may control the communication among the imaging device 110, the image processing system 130, the storage 140, the input/output device 150, and/or the network 160. The controller 120 may receive information from or send information to the imaging device 110, the storage 140, the input/output device 150, and/or the image processing system 130. For example, the controller 120 may receive commands from the input/output device 150 provided by a user. The controller 130 may process information input by a user via the input/output unit 150 and transform the information into one or more commands. As another example, the controller 120 may control the imaging device 110, the input/output device 150, and/or the image processing system 130 according to the received commands or transformed commands. As still another example, the controller 120 may receive image signals or data related to an object from the imaging device 110. As still another example, the controller 120 may send image signals or data to the image processing system 130. As still another example, the controller 120 may receive processed data or constructed image from the image processing system 130. As still another example, the controller 120 may send processed data or constructed image to the input/output device 150 for displaying. As still another example, the controller 120 may send processed data or constructed image to the storage 140 for storing. As still another example, the controller 120 may read information from the storage 140 and transmit the information to the image processing system 130 for processing. In some embodiments, the controller 120 may include a computer, a program, an algorithm, a software, a storage device, one or more interfaces, etc. Exemplary interfaces may include the interfaces of the imaging device 110, the input/output device 150, the image processing system 130, the storage 140, and/or other modules or units in the imaging system.

In some embodiments, the controller 120 may receive a command provided by a user including, for example, an imaging technician, a doctor, etc. Exemplary commands may relate to the scan duration, the location of the object, the location of a couch on which the object lies, the working condition of the imaging device 110, a specific parameter that may be used in image processing, or the like, or any combination thereof. In some embodiments, the controller 120 may control the image processing system 130 to select different algorithms to process an image.

The image processing system 130 may process information received from the imaging device 110, the controller 120, the storage 140, the network 160, and/or the input/output device 150. In some embodiments, the image processing system 130 may generate one or more images based on the information. In some embodiments, the image processing system 130 may process one or more images. The image(s) processed by the image processing system 130 may include 2D image(s) and/or 3D image(s). The image processing system 130 may deliver the images to the input/output device 150 for display, or to the storage 140 for storing. In some embodiments, the image processing system 130 may perform operations including, for example, image preprocessing, image reconstruction, image enhancement, image correction, image composition, lookup table creation, or the like, or any combination thereof. In some embodiments, the image processing system 130 may process data based on an algorithm including, for example, filtered back projection algorithm, fan-beam reconstruction, iterative reconstruction, gray level transformation, wave filtering, wavelet transform, Laplace transform, or the like, or any combination thereof.

In some embodiments, the image processing system 130 may include one or more processors to perform processing operations disclosed in this disclosure. The processor(s) may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), or any circuit or processor capable of executing one or more functions, or the like, or any combinations thereof.

In some embodiments, the image processing system 130 may also include a memory configured to store data and/or instructions. In some embodiments, the memory may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), a digital versatile disk ROM, etc. In some embodiments, the memory may store one or more programs and/or instructions that may be executed by the processor(s) of the image processing system 130 to perform exemplary methods described in the this disclosure. For example, the memory may store program(s) and/or instruction(s) executed by the processor(s) of the image processing system 130 to decompose an image, transform a decomposed image, and/or reconstruct an image. For example, a ROM may store a decomposition algorithm (e.g., Laplace algorithm) for the image processing system 130 to decompose an image.

In some embodiments, image data regarding a region of interest (ROI) may be processed by the image processing system 130. In some embodiments, the image processing system 130 may improve image quality, enhance image contrast, reduce or remove image artifact(s), reduce or eliminate image noise, and/or enhance the ROI edge information. The image artifact(s) may include oscillating artifact, speckle artifact, or the like, or any combination thereof. The ROI edge information may refer to the information (e.g., gray level, contrast, brightness, etc.) regarding the edge of a region of interest, for example, a breast edge, a tumor edge, or the like, or any combination thereof.

In some embodiments, the image processing system 130 may generate a control signal relating to the configuration of the imaging device 110. In some embodiments, the result generated by the image processing system 130 may be provided to other modules or units in the system including, for example, a database (not shown), a terminal (not shown) via the network 160. In some embodiments, the data from the image processing system 130 may be transmitted to the storage 140 for storing.

The storage 140 may store information sent from the imaging device 110, the controller 120, the image processing system 130, the input/output device 150, and/or an external data storage device via the network 160. The information stored may include a numerical value, a signal, an image, information of an object, an instruction, an algorithm, or the like, or a combination thereof. The storage 140 may refer to a system storage (e.g., a disk) that is provided integrally (i.e. substantially non-removable), or a storage that is removably connectable to the system via, for example, a port (e.g., a UBS port, a firewire port, etc.), a drive (a disk drive, etc.), etc. The storage 140 may include, for example, a hard disk, a floppy disk, selectron storage, random access memory (RAM), dynamic random access memory (DRAM), static random access memory (SRAM), bubble memory, thin film memory, magnetic plated wire memory, phase change memory, flash memory, a cloud disk, or the like, or a combination thereof. The storage 140 may be connected to or communicate with one or more components of the imaging system. In some embodiments, the storage 140 may be operationally connected with one or more virtual storage resources (e.g., cloud storage, a virtual private network, other virtual storage resources, etc.) via the network 160.

The input/output device 150 may receive or output information. In some embodiments, the input/output device 150 may include a terminal, a keyboard, a touch screen, a cursor control device, a remote controller, or the like, or any combination thereof. The terminal may include, for example, a control panel, a mobile device (e.g., a smart phone, a tablet, a laptop computer, or the like), a personal computer, other devices, or the like, or any combination thereof. The other devices may include a device that may work independently, or a processing unit or processing module assembled in another device. The cursor control device may include a mouse, a trackball, or cursor direction keys to communicate direction information and command selections to, for example, the image processing system 130 and to control cursor movement on a display device.

The input and/or output information may include programs, software, algorithms, data, text, number, images, voices, or the like, or any combination thereof. For example, a user may input some initial parameters or conditions to initiate an imaging process. As another example, some information may be imported from an external resource including, for example, a floppy disk, a hard disk, a wired terminal, a wireless terminal, or the like, or any combination thereof. In some embodiments, the input and/or output information may further include alphanumeric and/or other keys that may be inputted via a keyboard, a touch screen (for example, with haptics or tactile feedback), a voice input, an image input, an eye tracking input, a brain monitoring system, or any other comparable input mechanism. The output information may be transmitted to the storage 140, a display (not shown), a printer (not shown), a computing device, or the like, or a combination thereof.

In some embodiments, the input/output device 150 may include a user interface. The user interface may be a user interaction interface, a graphical user interface (GUI), or a user-defined interface, etc. The graphical user interface may allow a user to interact with other components (e.g., imaging device 110 and/or controller 120). For example, the graphical user interface may facilitate a user to input parameters, and intervene in the image processing procedure. In some embodiments, the input/output device 150 may include a display. The display may include a liquid crystal display (LCD), a light emitting diode (LED) based display, a flat panel display or curved screen (or television), a cathode ray tube (CRT), a 3D display, a plasma display panel, or the like, or any combination thereof.

Network 160 may facilitate communications among imaging device 110, controller 120, image processing system 130, storage 140, and/or input/output device 150. For example, information may be transmitted via network 160 from imaging device 110 to image processing system 130. As another example, information processed and/or generated by image processing system 130 may be transmitted via network 160 to storage 140 and/or input/output device 150.

In some embodiments, network 160 may be a wired network, a nanoscale network, a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud), or the like, or any combination thereof. Known communication techniques that provide a medium for transmitting data between separate are also contemplated. In some embodiments, the network 160 may be a single network or a combination of a variety of networks. The network 160 may include but not limited to local area network, wide area network, public network, private network, wireless LAN, virtual network, urban metropolitan area network, public switch telephone network, or a combination thereof. In some embodiments, the network 160 may include various network access points, for example, wired or wireless access points, base station or network switch points, by which data source may connect with the network 160 and the information may be transmitted via the network 160.

In some embodiments, two or more of the imaging device 110, the controller 120, the image processing system 130, the storage 140, and the input/output device 150 may be connected to or communicate with each other directly. In some embodiments, the imaging device 110, the controller 120, the image processing system 130, the storage 140, and the input/output device 150 may be connected to or communicate with each other via the network 160. In some embodiments, the imaging device 110, the controller 120, the image processing system 130, the storage 140, and the input/output device 150 may be connected to or communicate with each other via an intermediate unit (not shown). The intermediate unit may be a visible component or an invisible field (radio, optical, sonic, electromagnetic induction, etc.). The connection between different units may be wired or wireless. The wired connection may include using a metal cable, an optical cable, a hybrid cable, an interface, or the like, or any combination thereof. The wireless connection may include using a Local Area Network (LAN), a Wide Area Network (WAN), a Bluetooth, a ZigBee, a Near Field Communication (NFC), or the like, or any combination thereof. The network 160 that may be used in connection with the present system described herein are not exhaustive and are not limiting.

The imaging system described herein is merely provided for illustrating an example, and not intended to limit the scope of the present application. The imaging system may find its applications in different fields such as, for example, medicine or industry. The imaging device 110 may be used in internal inspection of components including, for example, flaw detection, security scanning, failure analysis, metrology, assembly analysis, void analysis, wall thickness analysis, or the like, or any combination thereof. To those skilled in the art, after understanding the basic principles of the connection between different components, the components and connection between the units may be modified or varied without departing from the principles. The modifications and variations are still within the scope of the current application described above. In some embodiments, these components may be independent, and in some embodiments, part of the components may be integrated into one component to work together.

FIG. 2-A is a schematic diagram illustrating an exemplary image processing system 130 according to some embodiments of the present disclosure. As shown in FIG. 2-A, the image processing system 130 may include an image acquisition block 201, a decomposition block 202, a transformation block 203, and a reconstruction block 204.

In some embodiments, image acquisition block 201 may acquire an image. The image may refer to a 2D image or 3D image. A 2D image may include a plurality of pixels. A 3D image may include a plurality of voxels. A pixel/voxel may have a corresponding value including, for example, brightness, color, gray level, or the like, or any combination thereof. For brevity, a pixel or a voxel may be referred to as an element. An element may refer to a pixel of a 2D image, or a voxel of a 3D image. In some embodiments, image acquisition block 201 may obtain a signal and/or data representative of an image. The signal may take any of a variety of forms, including an electro-magnetic form, an optical form, or the like, or any suitable combination thereof. In some embodiments, the data of the image may include raw data, processed data, control data, interaction data, image data, video data, analog data, digital data, or the like, or any combination thereof. In some embodiments, the image acquired may include an initial image, a region of interest (ROI) of the initial image, any image generated in an image processing procedure, or the like, or any combination thereof.

The initial image may refer to an image initially acquired by image acquisition block 201. In some embodiments, the initial image may be generated by imaging device 110. For example, the initial image may be an original image that may be captured by a CT system, a PET system, an MRI system, or the like, or any combination thereof. In some embodiments, the initial image may be obtained from storage 140, input/output device 150, or an external data storage device via network 160. For example, the initial image may be a processed image that may be previously stored in storage 140. In some embodiments, the initial image may be processed by image acquisition block 201, and a target image may be generated. The target image may refer to an image that may be decomposed, transformed, reconstructed, and/or enhanced by the image processing system 130.

The ROI image may include a region of interest of the initial image. The region of interest may refer to a portion of the initial image that may include information of interest including, for example, a tissue of interest, an organ of interest, a background of interest, a lesion of interest, any region of interest in the initial image, or the like, or any combination thereof. In some embodiments, a ROI may be extracted from the initial image, and a ROI image may be obtained. For example, an organ of interest may be extracted from the initial image, and an organ image may be generated. The organ image may include a lung, a breast, a part of skeleton, a part of muscle, an eye, any part in a body, or the like, or any combination thereof. Merely by way of example, the organ image may be a breast image extracted from a chest CT image.

In some embodiments, the image acquired by image acquisition block 201 may be obtained from imaging device 110, storage 140, input/output device 150, an external data storage device via network 160, any component of image processing system 130, or the like, or any combination thereof. In some embodiments, the image acquired may be processed by decomposition block 202, transformation block 203, and/or reconstruction block 204. For example, the image acquired may be decomposed by decomposition block 202 in order to enhance the image. In some embodiments, the image acquired may be stored in storage 140, displayed by input/output device 150, transmitted to a terminal or an external data storage device via network 160, or the like, or any combination thereof.

In some embodiments, decomposition block 202 may decompose a target image acquired by image acquisition block 201. As shown in FIG. 2-A, decomposition block 202 may include a first decomposition unit 202-1, a second decomposition unit 202-2, and/or an Nth decomposition unit 202-N, in which N may be an integer. In some embodiments, at least two decomposition units may use a same decomposition algorithm. In some embodiments, at least two decomposition units may use different decomposition algorithms.

In some embodiments, decomposition block 202 may decompose the image into one or more layers. In some embodiments, image decomposition may refer to dividing or decomposing the image into one or more layers of image based on the gray levels of the elements of the image, frequencies of the image, etc. A layer of image may include two or more sub-images. For example, a layer of image may include a low frequency sub-image and a high frequency sub-image. In some embodiments, the low frequency sub-image and the high frequency sub-image may be determined based on one or more frequency thresholds. For example, a sub-image with frequencies lower than or equal to a frequency threshold $T_f$ may be determined as the low frequency sub-image. As another example, a sub-image with frequencies greater than or equal to the frequency threshold $T_f$ may be determined as the high frequency sub-image. The threshold $T_f$ may be predetermined according to a default setting of the image processing system 130 or determined by a user through a GUI of the input/output device 150. In some embodiments, the threshold $T_f$ may be adjusted based on a processing efficiency of the image in the image processing system 130. In some embodiments, decomposition block 202 may further decompose a sub-image into one or more layers. For example, decomposition block 202 may decompose a low frequency sub-image or a high frequency sub-image into one or more layers. In some embodiments, decomposition block 202 may decompose the low frequency sub-image in a first layer into a low frequency sub-image and a high frequency sub-image in a second layer. In some embodiments, decomposition block 202 may decompose the low frequency sub-image in a second layer into a low frequency sub-image and a high frequency sub-image in a third layer.

In some embodiments, first decomposition unit 202-1 may decompose the image (or sub-image) based on a first decomposition algorithm. In some embodiments, second decomposition unit 202-2 may decompose the image (or sub-image) based on a second decomposition algorithm. In some embodiments, Nth decomposition unit 202-N may decompose the image (or sub-image) based on an Nth decomposition algorithm. In some embodiments, the decomposition algorithm may include a wavelet transform, a bilateral filtering, a Fourier algorithm, a discrete cosine transformation, a Laplace transform, any algorithm capable of decomposing an image, or the like, or any combination thereof. The wavelet transform may include a continuous wavelet transform, a discrete wavelet transform (DWT), a fast wavelet transform (FWT), a lifting scheme & generalized lifting scheme, a wavelet packet decomposition, a stationary wavelet transform, a fractional Fourier transform, a fractional wavelet transform, or the like, or any combination thereof. In some embodiments, at least two decomposition units may use different decomposition algorithms. For example, first decomposition unit 202-1 may decompose the image based on a Laplace transform, and second decomposition unit 202-2 may decompose the image based on a wavelet transform. As another example, first decomposition unit 202-1 may decompose the image based on a wavelet transform, and second decomposition unit 202-2 may decompose the image based on a Laplace transform.

In some embodiments, first decomposition unit 202-1 may decompose the image (or sub-image) into one or more layers based on a first decomposition algorithm. For example, first decomposition unit 202-1 may decompose the image (or sub-image) into two or more sub-images in a first layer based on a first decomposition algorithm. In some embodiments, first decomposition unit 202-1 may further decompose a sub-image in the first layer into two or more sub-images in a second layer based on the first decomposition algorithm. In some embodiments, first decomposition unit 202-1 may further decompose a sub-image in the Lth layer into two or more sub-images in a (L+1)th layer based on the first decomposition algorithm, in which L may be an integer larger than 2. For example, first decomposition block 202-1 may decompose the image (or sub-image) into 3 layers based on a wavelet transform, in which each layer may include a high frequency sub-image and a low frequency sub-image, the sub-images in the second layer may be generated from the low frequency sub-image in the first layer, and the sub-images in the third layer may be generated from the low frequency sub-image in the second layer.

In some embodiments, second decomposition unit 202-2 may decompose the image (or sub-image) into one or more layers based on a second decomposition algorithm. For example, second decomposition unit 202-2 may decompose the image (or sub-image) into two or more sub-images in a first layer based on a second decomposition algorithm. In some embodiments, second decomposition unit 202-2 may further decompose a sub-image in the first layer into two or more sub-images in a second layer based on the second decomposition algorithm. In some embodiments, second decomposition unit 202-2 may further decompose a sub-image in the Lth layer into two or more sub-images in a (L+1)th layer based on the second decomposition algorithm, in which L may be an integer larger than 2. For example, second decomposition block 202-2 may decompose the image (or sub-image) into 5 layers based on a Laplace transform, in which each layer may include a high frequency sub-image and a low frequency sub-image. The sub-images in the second layer may be generated from the low frequency sub-image in the first layer. The sub-images in the third layer may be generated from the low frequency sub-image in the second layer. The sub-images in the fourth layer may be generated from the low frequency sub-image in the third layer. The sub-images in the fifth layer may be generated from the low frequency sub-image in the fourth layer.

In some embodiments, Nth decomposition unit 202-N may decompose the image (or sub-image) into one or more layers based on an Nth decomposition algorithm. For example, Nth decomposition unit 202-N may decompose the image (or sub-image) into two or more sub-images in a first layer based on the Nth decomposition algorithm. In some embodiments, Nth decomposition unit 202-N may further decompose a sub-image in the first layer into two or more sub-images in a second layer based on the Nth decomposition algorithm. In some embodiments, Nth decomposition unit 202-N may further decompose a sub-image in the Lth layer into two or more sub-images in a (L+1)th layer based on the Nth decomposition algorithm, in which L may be an integer larger than 2.

In some embodiments, an image may be decomposed by first decomposition unit 202-1 into one or more layers. In some embodiments, a sub-image(s) in one of the layers generated by first decomposition unit 202-1 may be further decomposed by second decomposition unit 202-2 into one or more layers including sub-images. In some embodiments, a sub-image generated by the second decomposition unit 202-2 may further be decomposed by Nth decomposition unit 202-N. For example, first decomposition unit 202-1 may decompose the image into a first layer including a low frequency sub-image and a high frequency sub-image. The low frequency sub-image generated by first decomposition unit 202-1 may be further decomposed by second decomposition unit 202-2 into a low frequency sub-image and a high frequency sub-image of a second layer. The low frequency sub-image in the second layer generated by second decomposition unit 202-2 may be decomposed by Nth decomposition unit 202-N into a low frequency sub-image and a high frequency sub-image. In some embodiments, decomposition block 202 may decompose an image into no less than 2 layers (e.g., 5 layers), based on a same decomposition algorithm or different decomposition algorithms.

In some embodiments, the image(s) and/or sub-image(s) generated by decomposition block 202 may be acquired by image acquisition block 201, processed by transformation block 203, provided to reconstruction block 204, stored in storage 140, transmitted through network 160, or the like, or any combination thereof. For example, two or more sub-images may be reconstructed by reconstruction block 204 into a processed image.

Transformation block 203 may transform a target image or a sub-image. The image (or sub-image) to be transformed may be obtained from image acquisition block 201, or decomposition block 202. In some embodiments, transformation block 203 may change the value(s) of one or more elements in the image (or sub-image). As shown in FIG. 2-A, transformation block 203 may include a gray level transformation unit 203-1, a weight transformation unit 203-2, an enhancement unit 203-3, and an up-sampling unit 203-4.

Figure 8:
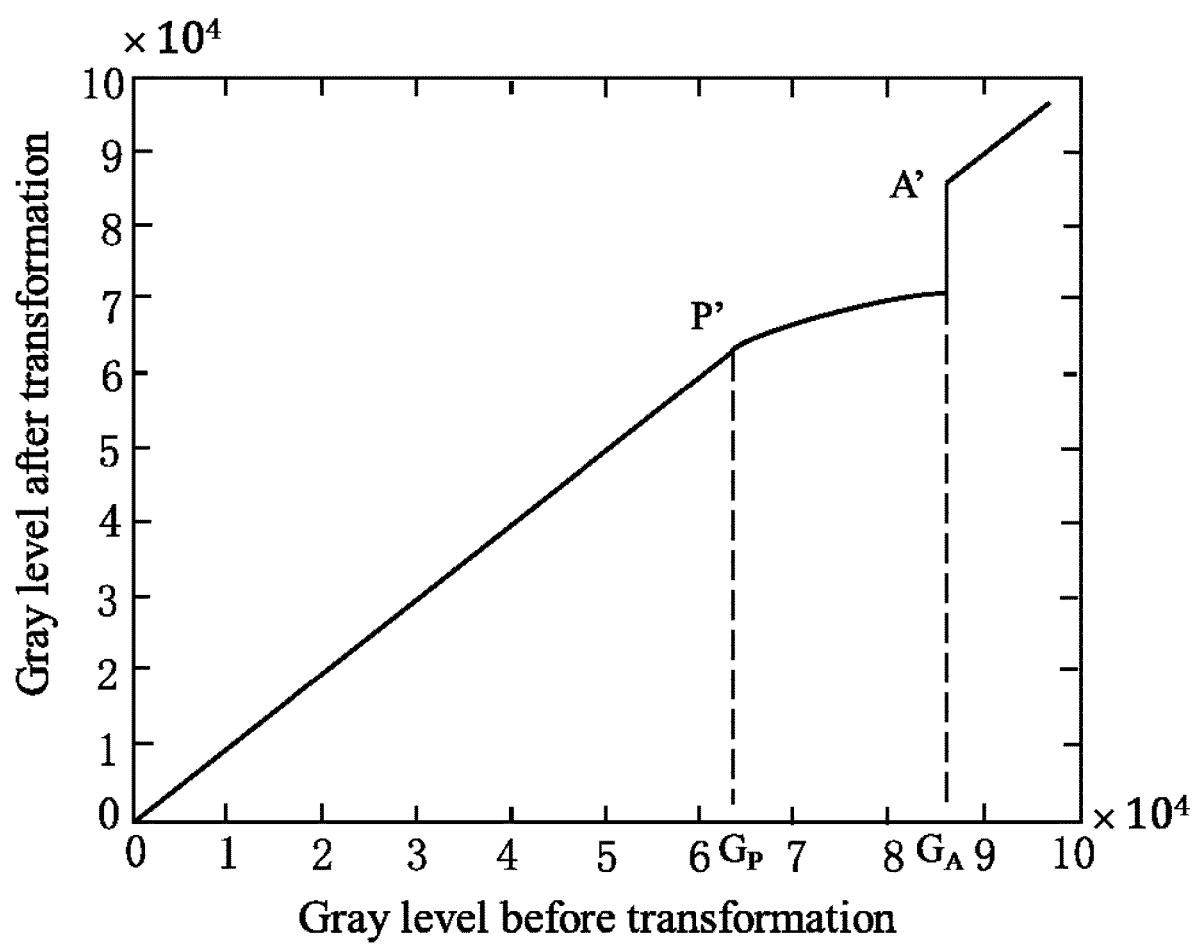
FIG. 8 is a schematic diagram illustrating an exemplary transformation curve according to some embodiments of the present disclosure.

Gray level transformation unit 203-1 may transform gray level(s) of one or more elements in a target image (or sub-image). In some embodiments, gray level transformation unit 203-1 may transform gray level(s) of one or more elements in a target image (or sub-image) to adjust the gray level(s) of the elements of an ROI, improve the quality of the target image (or sub-image), reduce noise, or the like, or any combination thereof. In some embodiments, gray level transformation unit 203-1 may transform the image (or sub-image) based on one or more transformation techniques. The transformation technique may be based on a transformation function, a transformation rule, a transformation curve, or the like, or any combination thereof. FIG. 5-A and FIG. 8 illustrate exemplary transformation curves. In some embodiments, gray level transformation unit 203-1 may transform different gray levels based on different transformation techniques. In some embodiments, the gray level may be represented by an integer. The gray level may be limited within a range. For example, the range of the gray level may be between 0 and 1, or between 1 and 255.

In some embodiments, the gray level may represent an intensity of an element in a grayscale image. In some embodiments, the gray level may represent an intensity of an element in a single color channel of a color image (or sub-image). The color image (or sub-image) may have a color space including a red/green/blue (RGB) space, a hue/saturation/luminance (HIS) space, a hue/saturation/lightness (HSL) space, a hue/saturation/value (HSV) space, a commission internationale de l'Eclairage (CIE) space, a hue/saturation/intensity (HSI) space, or any other color space that may present human color perception, or any combination thereof. For example, the gray level may represent the intensity in the red channel of the color image in the RGB space.

In some embodiments, the transformation technique(s) may be modified based on a transformation result generated by gray level transformation unit 203-1, stored in storage 140, or obtained from network 160. The transformation technique(s) may be used to compress or enhance the gray level(s) of one or more elements. In some embodiments, a transformation curve may be generated based on a characteristic curve. The characteristic curve may be determined based on an initial image, an ROI, an ROI edge, an ROI image, or a sub-image. For example, the characteristic curve may be determined based on a low frequency sub-image (e.g., a low frequency sub-image generated by decomposition block 202). In some embodiments, the characteristic curve may be represented by minimum distance(s) in a horizontal axis, and corresponding gray level(s) of elements in the low frequency sub-image in a vertical axis. In some embodiments, the horizontal axis may refer to the X axis of a Cartesian coordinate. In some embodiments, the vertical axis may refer to the Y axis of the Cartesian coordinate.

Weight transformation unit 203-2 may transform a gray level of an element in a target image (or sub-image) based on one or more weighting factors, or a weight image. In some embodiments, weight transformation unit 203-2 may transform gray level(s) to reduce noise, reduce speckle artifact, improve image contrast, or the like, or any combination thereof. In some embodiments, the weight image may be determined based on the target image (or sub-image). For example, a target sub-image may be a high frequency sub-image generated by decomposition block 202, and the weight image may be generated based on the values (e.g., the gray level(s), the brightness value(s), etc.) of one or more elements in the high frequency sub-image. As another example, a sub-image may be a low frequency sub-image generated by decomposition block 202, and the weight image may be generated based on the values (e.g., the gray level(s), the brightness value(s), etc.) of one or more elements in the low frequency sub-image.

Enhancement unit 203-3 may enhance a target image (or sub-image). In some embodiments, enhancement unit 203-3 may enhance the image (or sub-image) based on a linear enhancement and/or a nonlinear enhancement. The linear enhancement may include a Max–Min contrast technique, percentage contrast technique and piecewise contrast technique, or the like, or any combination thereof. The nonlinear enhancement may include histogram equalization technique, adaptive histogram equalization technique, homomorphic filter technique and unsharp mask, or the like, or any combination thereof. In some embodiments, enhancement unit 203-3 may enhance a target sub-image generated by decomposition block 202. For example, enhancement unit 203-3 may enhance a high frequency sub-image or a low frequency sub-image decomposed by first decomposition unit 202-1, second decomposition unit 202-2, or Nth decomposition unit 202-N.

Up-sampling unit 203-4 may up-sample a target image (or sub-image). In some embodiments, up-sampling unit 203-4 may up-sample the target image (or sub-image) based on one or more interpolation processes including, for example, piecewise constant interpolation, linear interpolation, polynomial interpolation, spine interpolation, or the like, or any combination thereof. In some embodiments, one or more sub-images may be up-sampled by up-sampling unit 203-4. For example, the high frequency sub-image(s) and/or the low frequency sub-image(s) generated by decomposition block 202 may be interpolated by up-sampling unit 203-4.

In some embodiments, the image and/or sub-image transformed by transformation block 203 may be decomposed by decomposition block 202, reconstructed by reconstruction block 204, stored in storage 140, displayed by input/output device 150, or transmitted through network 160. In some embodiments, two or more sub-images transformed by the same unit in transformation block 203 may be reconstructed into a composite image. For example, two or more sub-images transformed by gray level transformation unit 203-1 may be reconstructed by reconstruction block 204 into a composite image. In some embodiments, the image and/or sub-image transformed by two or more units in the transformation block 203 may be reconstructed. For example, a low frequency sub-mage transformed by gray level transformation unit 203-1 and a high frequency sub-image transformed by weight transformation unit 203-2 may be reconstructed into a composite image.

Reconstruction block 204 may reconstruct an image based on two or more images (or sub-images). The images (or sub-images) may be obtained from image acquisition block 201, decomposition block 202, transformation block 203, storage 140, input/output device 150, or an external data storage device via network 160. In some embodiments, reconstruction block 204 may reconstruct an image based on a technique including, for example, a filter back projection algorithm, an iterative reconstruction algorithm, local reconstruction algorithm, multiple additive regression tree algorithm, Random transform algorithm, Fourier transform algorithm, or the like, or any combination thereof.

FIG. 2-B is a flowchart of an exemplary process for processing an image according to some embodiments of the present disclosure. The process may include acquiring image 211, decomposing image 212, transforming image 213, and reconstructing image 214.

In 211, an image may be acquired by image acquisition block 201. The image may be acquired from imaging device 110, storage 140, input/output device 150, network 160, any component in image processing system 130, or the like, or any combination thereof. The image acquired may include an initial image, an ROI image, any image generated in an image processing procedure, or the like, or any combination thereof. In some embodiments, information may be extracted from an initial image by image acquisition block 201, and a target image may be generated. For example, the region of interest may be extracted from an initial image by image acquisition block 201, and an ROI image may be generated. The initial image and/or the target image may be processed in the subsequent procedure.

In some embodiments, the image acquired in 211 may be a 2D image or 3D image. In some embodiments, the image acquired may be a grey level image or color image. In some embodiments, the image acquired may be a medical image, for example, a CT image, an MRI image, a PET image, or the like, or any combination thereof.

In some embodiments, the image acquired at 211 may be provided to decomposition block 202, reconstruction block 204, input/output device 150, or the like, or any combination thereof. For example, a breast image acquired in 211 may be used to generate one or more sub-images by decomposition block 202. In some embodiments, the image may be store at storage 140, an external data storage device via network 160, any component capable of storing, or the like, or any combination thereof.

In 212, the image acquired or generated in 211 may be decomposed. The decomposition may be performed by decomposition block 202. In some embodiments, the image may be decomposed into one or more layers. In some embodiments, decomposition block 202 may use one or more decomposition algorithms to decompose the image. The decomposition algorithm may include a bilateral filtering algorithm, a wavelet filtering algorithm, a Laplace transform, an intrinsic image decomposition algorithm, or the like, or any combination thereof. In some embodiments, the image may be decomposed by different decomposition units. For example, the image may be decomposed by first decomposition unit 202-1 and/or second decomposition unit 202-2. In some embodiments, the image may be decomposed based on a sub-image. For example, the image may be decomposed into a first layer including a low frequency sub-image and a high frequency sub-image by first decomposition unit 202-1. The low frequency sub-image in the first layer may be decomposed into a second layer including a low frequency sub-image and a high frequency sub-image by second decomposition unit 202-2. Similarly, the low frequency sub-image in the second layer may be further decomposed into an Nth layer by Nth decomposition unit 202-N. In some embodiments, one or more of the sub-images obtained after decomposition may be under-sampled. For example, if the decomposition block 202 decompose the image using a wavelet transform or Laplace transform, the sub-images obtained may be under-sampled.

In some embodiments, the image may be decomposed by decomposition block 202 into L layers. For example, the image may be decomposed by first decomposition unit 202-1 into a first layer. The first layer may include a low frequency sub-image and a high frequency image. The low frequency sub-image in the first layer may be further decomposed by first decomposition unit 202-1 into a second layer. The low frequency sub-image in the second layer may be further decomposed by first decomposition unit 202-1 into a third layer. Likewise, the low frequency sub-image in the (L−1)th layer may be further decomposed by first decomposition unit 202-1 into an Lth layer. Similarly, the image may be decomposed by decomposition block 202 into L'+N layers. For example, the image may be decomposed by second decomposition unit 202-2 into L'+N layer. In some embodiments, the image may be decomposed by two or more of the decomposition units (e.g., first decomposition unit 202-1, second decomposition unit 202-2, Nth decomposition unit 202-N, etc.) into L layers. For example, the image may be decomposed by first decomposition unit 202-1 into a first layer. The first layer may include a low frequency sub-image and a high frequency image. The low frequency sub-image or the high frequency image in the first layer may be further decomposed by second decomposition unit 202-2 into a second layer. Likewise, the low frequency sub-image or the high frequency image in the (L−1)th layer may be further decomposed by Nth decomposition unit 202-N into an Lth layer. In some embodiments, two or more of the decomposition units may use the same decomposition algorithm or different decomposition algorithms. In some embodiments, two or more of the decomposition units may use the same parameter of different parameters with the same decomposition algorithm.

In 213, the image(s) acquired in 211 and/or the sub-image (s) generated in 212 may be transformed. Transformation block 203 may perform 213. In some embodiments, one or more of the images (and/or sub-images) may be transformed by gray level transformation unit 203-1 based on a gray level transformation curve. The gray level transformation curve may be determined by the gray level transformation unit 203-1 based on the gray levels of the elements in the images (and/or sub-images) to be transformed. In some embodiments, one or more of the images (and/or sub-images) may be transformed by weight transformation unit 203-2 based on a weight image. The weight image may be determined by weight transformation unit 203-2 based on the images (and/or sub-images) to be transformed. In some embodiments, in 212, one or more of the images (and/or sub-images) may be enhanced by enhancement unit 203-3. For example, a high frequency sub-image may be enhanced using a histogram equalization technique. In some embodiments, one or more of the images (and/or sub-images) may be up-sampled by up-sampling unit 203-4. For example, a high frequency sub-image may be up-sampled through linear interpolation. In some embodiments, one or more images (or sub-images) may be replaced by another image (or sub-image). For example, a high frequency sub-image (or low frequency sub-image) in an xth (x may be an integer) layer generated based on a first decomposition algorithm may be replaced by a high frequency sub-image (or low frequency sub-image) in the xth layer generated based on a second decomposition algorithm. In some embodiments, two or more of the transformed images (and/or sub-images) may be used to reconstruct a composite image in the subsequent procedure.

In 214, a composite image (or sub-image) may be reconstructed based on two or more decomposed images (and/or sub-images) generated in 213. Reconstruction block 204 may perform 214. In some embodiments, two or more sub-images in the same layer may be used to reconstruct an image (or sub-image) in another layer. For example, a first layer including a low frequency sub-image and a high frequency sub-image may be used to reconstruct a composite image. As another example, a second layer including a low frequency sub-image and a high frequency sub-image may be used to reconstruct a low frequency sub-image in a first layer. In some embodiments, the reconstructed low frequency sub-image in the first layer together with a high sub-image in the first layer may be further used to reconstruct a composite image. In some embodiments, the reconstructed image may have enhanced information comparing with the initial image. For example, the image contrast, and/or edge information may be enhanced in the reconstructed image. As another example, the noise information may be reduced or removed in the reconstructed image. In some embodiments, the image (or sub-image) reconstructed in 214 may be subsequently transmitted to and/or provided to image acquisition block 201, decomposition block 202, transformation block 203, storage 140, input/output device 150, network 160, or the like, or any combination thereof. For example, the reconstructed image may be displayed in input/output device 150. As another example, the reconstructed image may be stored in the storage 140, or an external data storage device via network 160.

FIG. 3-A is a schematic diagram illustrating an exemplary image acquisition block 201 according to some embodiments of the present disclosure. As shown in FIG. 3-A, image acquisition block 201 may include an initial image acquisition unit 301, a region of interest (ROI) extraction unit 302, an ROI edge extraction unit 303, and an ROI image determination unit 304.

Initial image acquisition unit 301 may acquire an initial image. The initial image may include an image acquired from imaging device 110, storage 140, and/or an external data storage device via network 160. In some embodiments, the initial image may be a processed image generated from decomposition block 202, transformation block 203, and/or reconstruction block 204. In some embodiments, an ROI and/or an ROI edge may be extracted from the initial image. In some embodiments, the initial image may be processed to generate an ROI image. In some embodiments, the initial image may be decomposed by decomposition block 202 and/or transformed by transformation block 203. For example, a breast CT image may be acquired as an initial image, and the initial image may be decomposed into one or more layers by decomposition block 202. In some embodiments, the initial image may be generated by an FFDM system or a DBT system. In some embodiments, the initial image may be designated as a positive image, in which the gray levels of the elements of background may be higher than that of region of interest. In some embodiments, the initial image may be designated as a negative image, in which the gray levels of the elements of background may be lower than that of region of interest.

Region of interest (ROI) extraction unit 302 may extract an ROI from an initial image. In some embodiments, the ROI may include a region of an image, the region corresponding to a tissue, an organ, a tumor, or the like, or any combination thereof. For instance, the ROI may include a region of an image, the region corresponding to a breast, a region of a lung, a region of a skeleton, a region of the liver, a region of the brain, a region of a kidney, any region of a body, or the like, or any combination thereof.

For brevity, an image, or a portion thereof (e.g., an ROI in the image) corresponding to an object (e.g., a tissue, an organ, a tumor, etc., of a subject (e.g., a patient, etc.)) may be referred to as an image, or a portion of thereof (e.g., an ROI) of or including the object, or the object itself. For instance, an ROI corresponding to the image of a liver may be described as that the ROI includes a liver. As another example, an image of or including a liver may be referred to a liver image, or simply liver. For brevity, that a portion of an image corresponding to an object is processed (e.g., extracted, segmented, etc.) may be described as the object is processed. For instance, that a portion of an image corresponding to a liver is extracted from the rest of the image may be described as that the liver is extracted.

In some embodiments, the ROI may include a partial region of a tissue, an organ, a tumor, or the like, or any combination thereof. In some embodiments, the partial region may include a region of the center or closed to the center of a tissue, organ, tumor, or the like, or any combination thereof. In some embodiments, the partial region may include a region with elements whose gray levels may be within a determined range. In some embodiments, the ROI may be extracted to provide an ROI image. For example, a region of breast may be extracted to generate a breast image.

ROI edge extraction unit 303 may extract an ROI edge from an initial image. The ROI edge may refer to an edge of a tissue, an organ, a tumor of interest, etc. For example, the ROI edge may refer to an edge of breast, an edge of lung, an edge of skeleton, an edge of liver, an edge of brain, an edge of kidney, an edge of any region of a body, or the like, or any combination thereof. In some embodiments, the extracted ROI edge may be used to generate an ROI image.

ROI image determination unit 304 may determine an ROI image. An ROI image may refer to an image with an ROI and/or an ROI edge that may be extracted from an initial image. ROI image determination unit 304 may determine an ROI image based on an ROI extracted by ROI extraction unit 302, and/or an ROI edge extracted by ROI edge extraction unit 303. In some embodiments, the ROI image may include a breast image, a lung image, a skeleton image, a liver image, a brain image, a kidney image, any part of a body, or the like, or any combination thereof. For example, a breast image may be determined, based on a region of breast and an edge of the region of breast. In some embodiments, the ROI image may not include the background of the initial image. For example, a breast image may exclude a background of the chest in initial image. In some embodiments, the ROI image may be decomposed by decomposition block 202. For example, a breast image may be decomposed by decomposition block 202 into a low frequency sub-image and a high frequency sub-image.

FIG. 3-B is a flowchart of an exemplary process for acquiring an image according to some embodiments of the present disclosure. The process may include acquiring initial image 311, extracting ROI 312, extracting ROI edge 313, and determining ROI image 314.

In 311, an initial image may be acquired by initial image acquisition unit 301. In some embodiments, the initial image may be acquired from imaging device 110, storage 140, an external data storage device via network 160, or the like, or any combination thereof. In some embodiments, the initial image may be a CT image, an MRI image, a PET image, an infrared image, or the like, or any combination thereof. For example, imaging device 110 may generate a chest CT image, and the chest CT image may be acquired by initial image acquisition unit 301 at 311. In some embodiments, the initial image may be transformed to a log-domain image based on logarithm transformation. The log-domain image may be processed in the subsequent operations.

In 312, an ROI may be extracted based on the initial image acquired in 311. The operation 312 may be performed by ROI extraction unit 302. In some embodiments, the ROI may be extracted based on one or more segmentation algorithms including, for example, OSTU technique, watershed algorithm, threshold segmentation, region growing segmentation, energy-based 3D reconstruction segmentation, level set-based segmentation, region split and/or merge segmentation, edge tracing segmentation, statistical pattern recognition, C-means clustering segmentation, deformable model segmentation, graph search segmentation, neural network segmentation, geodesic minimal path segmentation, target tracking segmentation, atlas-based segmentation, rule-based segmentation, coupled surface segmentation, model-based segmentation, deformable organism segmentation, or the like, or any combination thereof.

In some embodiments, the ROI may be extracted based on gray levels of the initial image. In some embodiments, a gray histogram may be generated based on the initial image. In some embodiments, the ROI may be extracted based on the gray histogram. In some embodiments, a segmentation algorithm may be determined according to the characteristics of the gray histogram. For example, the gray histogram of an initial image of a breast may have double-peaks, considering the OSTU technique may have relatively high efficiency and precision for gray histogram with double-peaks, the OSTU technique may be used to segment the initial image. As another example, the watershed algorithm may be used to extract a region of breast.

In some embodiments, the algorithms for extracting the ROI may be stored in ROI extraction unit 302, storage 140, network 160, or other mobile storage device. Exemplary mobile storage device may include a flash drive, a floppy disk, an optical disk, a memory card, a zip disk, a magnetic tape, or the like, or any combination thereof. In some embodiments, the algorithms for extracting the ROI may be retrieved from one or more external data storage devices via network 160.

In 313, an ROI edge (e.g., a breast edge) may be extracted based on the initial image acquired in 311. The operation 313 may be performed by ROI edge extraction unit 303. In some embodiments, the ROI edge may be extracted based on the gray level variation characteristics of the edge. In some embodiments, the gray levels of the elements of the ROI edge may be similar to that of the background. In some embodiments, the ROI edge may have variations in the gray levels of the elements of the ROI edge. In some embodiments, before extracting the ROI edge, the gray levels of the elements of the ROI edge may be enhanced, and thus the ROI edge may be more distinguishable from the background, and the extraction of ROI edge may be facilitated. In some embodiments, if the initial image is an FFDM image, the initial image may have different noise levels because of, e.g., the variation in the X-ray dose. In some embodiments, the noise level of the initial image may have an impact on the gray levels of the elements of the ROI edge if the gray levels are enhanced. In some embodiments, in order to reduce or eliminate the impact of the noise, a denoising process may be carried out before the gray levels of the elements of the ROI edge are enhanced. In some embodiments, considering the attenuation of X-ray may obey an exponential distribution, in order to decrease computational complexity and/or increase the efficiency of ROI edge extraction, the ROI edge may be extracted based on a log-domain image originated from the initial image.

In some embodiments, the log-domain image may be denoised based on a denoising algorithm. The denoising algorithm may include a Gaussian filtering algorithm, a mean filtering algorithm, a non-local means (NLM) algorithm, a block technique of 3-Dimension (BM3D) algorithm, a total variation algorithm, a partial differential equation (PDE) algorithm, a wavelet threshold algorithm, or the like, or any combination thereof. In some embodiments, at 313, the denoised log-domain image may be pre-processed by gray level transformation. In some embodiments, the gray level transformation may refer to a gradient transformation of the gray levels of the elements of the log-domain image. In some embodiments, a Sobel gradient operator may be used in the gradient transformation. In some embodiments, a difference algorithm may be used in the gray level transformation. That is, a differential operation of the denoised log-domain image may be carried out.

It should be noted that, in some embodiments, if the initial image is directly collected from an FFDM system, the gray levels of the elements of an ROI may be lower than that of the background. That is, the gray level in different regions may have the relationship: gray levels of the elements of background>gray levels of the elements of ROI edge>gray levels of the elements of ROI. In some embodiments, after denoising process of the log-domain image, the gray level fluctuation may be decreased (e.g., the gray levels of the elements of the background may tend to be at the same level). In some embodiments, after gray level transformation, the gray level in different regions may have the relationship: gray levels of the elements of ROI edge>gray levels of the elements of ROI>gray levels of the elements of background. In some embodiments, with denoising and/or gray level transformation of the log-domain image, it may be avoided that the elements in the background may be extracted as elements of the ROI edge, and the accuracy of the ROI edge may be improved.

In some embodiments, after denoising process and gray level transformation, the ROI edge may be extracted from the log-domain image. In some embodiments, an iteration technique may be used in the ROI edge extraction. In some embodiments, after denoising process and gray level transformation, the log-domain image may be represented by floating-point data. When using an iteration technique in the ROI edge extraction, the floating-point data may be used, avoiding the need to convert the floating-point data to integer data and loss of image accuracy or image quality associated with the conversion.

The iteration technique for determining the ROI edge may include a first iteration, a second iteration, and/or an Nth iteration. An initial threshold $T_0$ may be determined as a half of the sum of the maximum gray level and the minimum gray level in the denoised and/or pre-processed log-domain image. In the first iteration, the denoised and/or pre-processed log-domain image may be divided as a first region and a second region based on the threshold $T_0$. In the first region, the gray levels of elements may be greater than $T_0$. In the second region, the gray levels of the elements may be equal to and/or less than $T_0$. In some embodiments, the average gray level of the elements of the first region and the second region may be calculated separately. For example, $G_{first}$ may represent the average gray level of the elements of the first region, and $G_{second}$ may represent the average gray level of the elements of the second region. In some embodiments, $T_0$ may be updated to have the value of $T_1$, in which $T_1$ may be a half of the sum of $G_{first}$ and $G_{second}$ (i.e., $T_1=(G_{first}+G_{second})/2$).

In the second iteration, if abs($T_1-T_0$)>1 (abs may refer to the absolute value), the denoised and/or pre-processed log-domain image may be further divided as a third region and a fourth region. In the third region, the gray levels of elements may be greater than $T_1$. In the fourth region, the gray levels of elements may be equal to and/or less than $T_1$. In some embodiments, the average gray level of the elements of the third region and the average gray level of the elements of the fourth region may be calculated separately. For example, $G_{third}$ may represent the average gray level of the elements of the third region, and $G_{fourth}$ may represent the average gray level of the elements of the fourth region. In some embodiments, $T_1$ may be updated to have the value of $T_2$, in which $T_2$ may be a half of the sum of $G_{third}$ and $G_{fourth}$ (i.e., $T_2=(G_{third}+G_{fourth}/2)$.

In the third iteration, if abs($T_2-T_1$)>1, the denoised and/or pre-processed log-domain image may be further divided as a fifth region and a sixth region. In the fifth region, the gray levels of elements may be greater than $T_2$. In the sixth region, the gray levels of elements may be equal to and/or less than $T_2$. In some embodiments, the average gray level of the elements of the fifth region and the average gray level of the elements of the sixth region may be calculated separately. For example, $G_{fifth}$ may represent the average gray level of the elements of the fifth region, and $G_{sixth}$ may represent the average gray level of the elements of the sixth region. In some embodiments, $T_2$ may be updated to have the value of $T_3$, in which $T_3$ may be a half of the sum of $G_{fifth}$ and $G_{sixth}$ (i.e., $T_3=(G_{fifth}+G_{sixth})/2$). Until ($T_{i+1}-T_i$)<1, the iteration may stop, and the denoised and/or pre-processed log-domain image may not be further divided. $T_{i+1}$ may be determined as the threshold for ROI edge extraction. The denoised and/or pre-processed log-domain image may be divided based on $T_{i+1}$. A set of elements, whose gray levels may be greater than $T_{i+1}$ may be determined as belonging to the ROI edge. In some embodiments, the threshold (e.g., $T_0$, $T_1$, $T_2$, $T_3$, . . . , $T_i$, etc.) in the iteration may be multiplied by a weighting factor to increase the accuracy of the ROI edge. In some embodiments, the weighting factor may be determined based on the threshold variation characteristics during the iteration. In some embodiments, the threshold variation characteristics may refer to the variation between two or more of the thresholds such as $T_0$, $T_1$, $T_2$, $T_3$, . . . , $T_{i+1}$, etc. In some embodiments, the weighting factor may be less than 1.

In some embodiments, in addition to iteration technique, the ROI edge may be extracted using an OTSU algorithm, or any other algorithm that may facilitate the extraction of an ROI edge. In some embodiments, the extracted ROI edge may be provided to ROI image determination unit 304 at 314. In some embodiments, the extracted ROI edge may be stored in ROI edge extraction unit 303, storage 140, network 160, or other mobile storage device.

In 314, an ROI image may be determined. The operation 314 may be performed by ROI image determination unit 304. In some embodiments, the ROI image may be determined based on the ROI extracted in 312, and/or the ROI edge extracted in 313. In some embodiments, the ROI image may be generated by combining the ROI and the ROI edge. In some embodiments, the generated ROI image may include one or more isolated elements (e.g., one or more elements of the background may be extracted as elements of the ROI image). In some embodiments, the isolated elements may be removed from the ROI image to enhance the quality of the ROI image. In some embodiments, the ROI image may be provided to decomposition block 202, reconstruction block 204, storage 140, input/output device 150, and/or network 160. For example, a breast image may be decomposed by decomposition block 202 into L layers.

It should be noted that the above description regarding FIG. 3-A and FIG. 3-B is merely an example, and should not be understood as the only embodiment. To those skilled in the art, after understanding the basic principles of the operations, the diagram and/or flowchart may be modified or varied without departing from the principles. The modifications and variations are still within the scope of the current application described above. For example, 312, 313, and/or 314 may be skipped, which means the initial image may be transmitted to decomposition block 202, transformation block 203, and/or reconstruction block 204 for further processing.

FIG. 4-A is a flowchart of an exemplary process for decomposing an image according to some embodiments of the present disclosure. The process may include a first decomposition operation 401, and a second decomposition operation 402.

In 401, an image may be decomposed into L (L may be an integer, and L≥1) layers based on a first decomposition by decomposition block 202. The image may include the initial image acquired in 311, the ROI extracted in 312, the ROI edge extracted in 313, the ROI image determined in 314, a decomposed image, a transformed image, an image acquired by imaging device 110, storage 140, and/or network 160, or the like, or any combination thereof. In some embodiments, the image may be decomposed by first decomposition unit 202-1, second decomposition unit 202-2, and/or Nth decomposition unit 202-N.

In some embodiments, the image may be decomposed using a wavelet transform, a bilateral filtering, a Fourier algorithm, a discrete cosine transformation, a Laplace transform, any algorithm capable of decomposing an image, or the like, or any combination thereof. For example, the image may be decomposed into a low frequency sub-image and a high frequency sub-image using a bilateral filter. As another example, the image may be decomposed into L layers by Laplace transform. In some embodiments, a layer may include a low frequency sub-image and a high frequency sub-image. For example, the image may be decomposed into 3 layers by Laplace transform. First, the image may be decomposed into a first layer including a low frequency sub-image and a high frequency sub-image by Laplace transform; second, the low frequency sub-image in the first layer may be further decomposed into a second layer including a low frequency sub-image and a high frequency sub-image by Laplace transform; third, the low frequency sub-image in the second layer may be further decomposed into a third layer including a low frequency sub-image and a high frequency sub-image by Laplace transform.

In some embodiments, the image may be decomposed into L layers by wavelet transform. For example, the image may be decomposed into 3 layers by wavelet transform. First, the image may be decomposed into a first layer including a low frequency sub-image and a high frequency sub-image by wavelet transform; second, the low frequency sub-image in the first layer may be further decomposed into a second layer including a low frequency sub-image and a high frequency sub-image by wavelet transform; third, the low frequency sub-image in the second layer may be further decomposed into a third layer including a low frequency sub-image and a high frequency sub-image by wavelet transform.

In 402, an image may be decomposed into L'+N (L' and N may be integers, L'≥1 and N≥1) layers based on a second decomposition by decomposition block 202. In some embodiments, the image may be decomposed by first decomposition unit 202-1, second decomposition unit 202-2, and/or Nth decomposition unit 202-N. In some embodiments, the image to be decomposed in 402 may be the same as that to be decomposed in 401. In some embodiments, the image to be decomposed in 402 may be different from that to be decomposed in 401. In some embodiments, the image to be decomposed in 402 may be a sub-image generated in 401. In some embodiments, the image may be decomposed by a wavelet transform, a bilateral filtering, a Fourier algorithm, a discrete cosine transformation, a Laplace transform, any algorithm capable of decomposing an image, or the like, or any combination thereof.

In some embodiments, the image may be decomposed into L'+N layers by a wavelet transform. For example, if L'=3 and N=1, the image may be decomposed into 4 layers by a wavelet transform. First, the image may be decomposed into a first layer including a low frequency sub-image and a high frequency sub-image by a wavelet transform; second, the low frequency sub-image in the first layer may be further decomposed into a second layer including a low frequency sub-image and a high frequency sub-image by a wavelet transform; third, the low frequency sub-image in the second layer may be further decomposed into a third layer including a low frequency sub-image and a high frequency sub-image by a wavelet transform; fourth, the low frequency sub-image in the third layer may be further decomposed into a fourth layer including a low frequency sub-image and a high frequency sub-image by a wavelet transform.

The sub-image(s) generated in 401 and/or 402 may be provided to image acquisition block 201, transformation block 203, reconstruction block 204, storage 140, input/output device 150, network 160, or the like, or any combination thereof. For example, a sub-image may be transformed by gray level transformation unit 203-1. As another example, a sub-image may be transformed by transformation block 203-2. As still another example, one or more of elements of a sub-image may be replaced by that of another sub-image.

It should be noted that different layers may be decomposed using different algorithms. In some embodiments, the number (L'+N) of layers generated in 402 may be larger than that of layers (L) generated in 401. For example, an image may be decomposed into 4 layers at 402, while the same image may be decomposed into 3 layers at 401. In some embodiments, 401 or 402 may be skipped. In some embodiments, one or more operations may be added before or after 401 and/or 402. For example, a third decomposition operation may be added after 402.

FIG. 4-B is a schematic diagram of an exemplary L layers decomposed by a first decomposition according to some embodiments of the present disclosure. As shown in FIG. 4-B, the image 411 may be decomposed into L layers. The image 411 may be decomposed by decomposition block 202. For example, the image 411 may be decomposed by first decomposition unit 202-1. In some embodiments, the image 411 may be decomposed using one or more decomposition algorithms. For example, the image may be decomposed using a Laplace transform. In some embodiments, each layer may include two or more sub-images. For example, a single layer may include a low frequency sub-image, a medium frequency sub-image, and/or a high frequency sub-image.

In some embodiments, the image 411 may be decomposed into a first layer including a low frequency sub-image 412 and a high frequency sub-image 413. The low frequency sub-image 412 in the first layer may be decomposed into a second layer including a low frequency sub-image 414 and a high frequency sub-image 415. The low frequency sub-image 414 in the second layer may be decomposed into a third layer including a low frequency sub-image 416 and a high frequency sub-image 417. Similarly, the low frequency sub-image (not shown) in a (L−1)th layer may be decomposed into a Lth layer including a low frequency sub-image 418 and a high frequency sub-image 419. In some embodiments, a high frequency sub-image in a layer may be decomposed into a layer including a low frequency sub-image and a high frequency sub-image.

FIG. 4-C is a schematic diagram of an exemplary L'+N layers decomposed by a second decomposition according to some embodiments of the present disclosure. As shown in FIG. 4-C, the image 421 may be decomposed into L'+N layers. The image may be decomposed by decomposition block 202. For example, the image may be decomposed by second decomposition unit 202-2. In some embodiments, the image may be decomposed using decomposition algorithms. For example, the image may be decomposed using a wavelet transform.

In some embodiments, the image 421 may be decomposed into a first layer including a low frequency sub-image 422 and a high frequency sub-image 423. The low frequency sub-image 422 in the first layer may be decomposed into a second layer including a low frequency sub-image 424 and a high frequency sub-image 425. The low frequency sub-image 424 in the second layer may be decomposed into a third layer including a low frequency sub-image 426 and a high frequency sub-image 427. Similarly, the low frequency sub-image (not shown) in a (L'−1)th layer may be decomposed into a L'th layer including a low frequency sub-image 428 and a high frequency sub-image 429. The low frequency sub-image 428 in L'th layer may be decomposed into a (L'+1)th layer including a low frequency sub-image 430 and a high frequency sub-image 431. The low frequency sub-image 430 in the (L'+1)th layer may be decomposed into a (L'+2) layer including a low frequency sub-image (not shown) and a high frequency sub-image (not shown). Similarly, the low frequency sub-image (not shown) in a (L'+N−1)th layer may be decomposed into a (L'+N)th layer including a low frequency sub-image 432 and a high frequency sub-image 433. In some embodiments, a high frequency sub-image in a layer may be decomposed into a layer including a low frequency sub-image and a high frequency sub-image.

In some embodiments, L' may be equal to L. For example, if L' equals 3, L may be equal to 3. In some embodiments, N may be an integer greater than or equal to 1. For example, N may be equal to 1. In some embodiments, each layer may include two or more sub-images. For example, a single layer may include a low frequency sub-image, a medium frequency sub-image, and/or a high frequency sub-image.

FIG. 5-A is a schematic diagram illustrating gray level transformation unit 203-1 according to some embodiments of the present disclosure. As shown in FIG. 5-A, gray level transformation unit 203-1 may include a characteristic curve determination unit 501, a characteristic curve division unit 502, a transformation curve segment determination unit 503, a transformation curve generating unit 504, and a first update unit 505.

Figure 6:
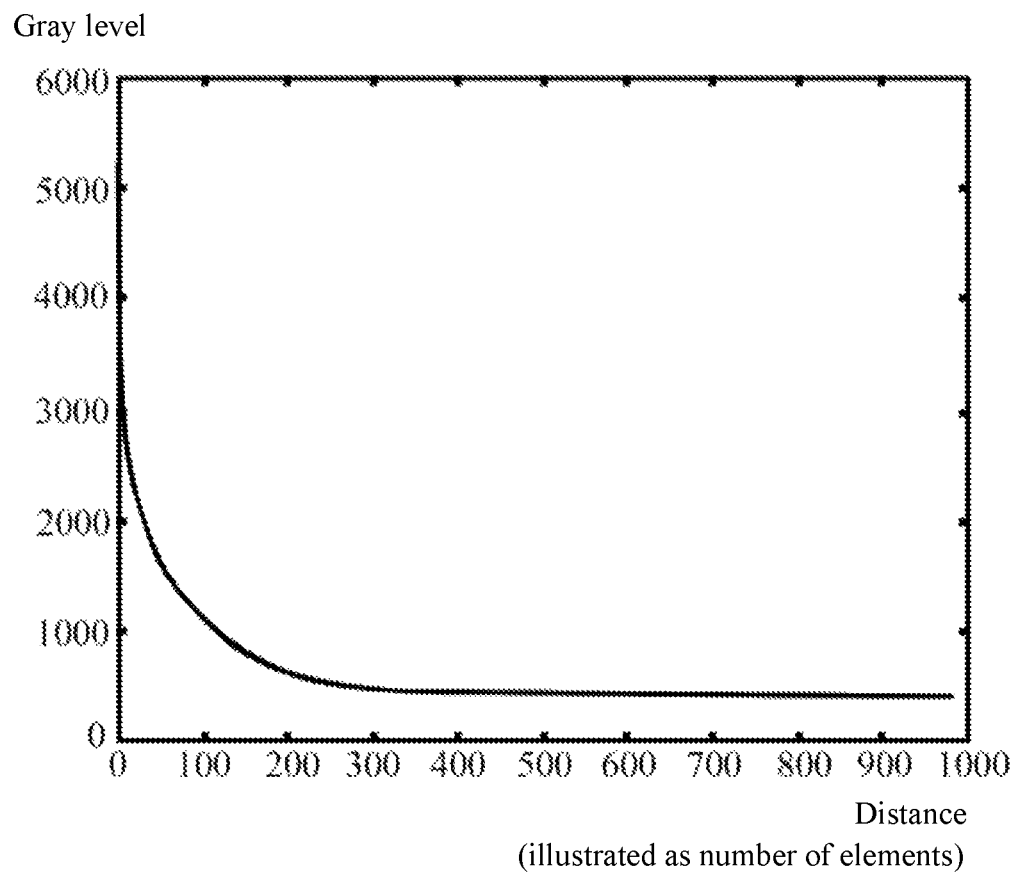
FIG. 6 is a schematic diagram illustrating an exemplary characteristic curve according to some embodiments of the present disclosure.

Characteristic curve determination unit 501 may determine a characteristic curve. In some embodiments, the characteristic curve may be determined based on a target image including, for example, an initial image, an ROI, an ROI edge, an ROI image, or a sub-image. For example, the characteristic curve may be determined based on a low frequency sub-image. The characteristic curve may illustrate the relationship between a distance and a corresponding gray level of an element (as shown in FIG. 6). In some embodiments, the distance may refer to the distance between an element of the target image and a reference edge of the target image. In some embodiments, the reference edge of the target image may refer to an ROI edge of the target image, or an outer edge of the entire target image. In some embodiments, the distance of an element of the target image may refer to a minimum distance from the element to the reference edge. For an element of the target image, the distance to each element of the reference edge may be calculated. In some embodiments, a line with minimum distance may be determined for each of a plurality of elements of the target image. In some embodiments, the value of the minimum distance may be expressed by the number of elements in the line with minimum distance. In some embodiments, an element may have one or more distances to the reference edge, and the distance in the characteristic curve may refer to the minimum distance. In some embodiments, different elements may have different distances (e.g., 0.5 cm, 0.8 cm, 1 cm, etc.), for example, elements further away from the reference edge may have a larger distance than those close to the reference edge. In some embodiments, a distance may correspond to a gray level. In some embodiments, one or more elements may have the same distance, and the elements may have different gray levels; then the gray level corresponding to the distance may be determined as the average gray level of the elements with the same distance. For example, three elements A, B, and C have the same minimum distance of 0.5 cm; then the gray level corresponding to the distance may be calculated as $G_{0.5cm}=(G_A+G_B+G_C)/3$.

Characteristic curve division unit 502 may divide a characteristic curve into two or more segments. In some embodiments, characteristic curve division unit 502 may generate N curve segments based on the characteristic curve, in which N may be an integer larger than 1.

Transformation curve segment determination unit 503 may determine one or more transformation curve segments. A transformation curve segment may be part of a transformation curve. In some embodiments, the transformation curve segment(s) may be determined based on one or more characteristic curve segments. For example, a transformation curve segment may be determined based on a corresponding characteristic curve segment.

Transformation curve generating unit 504 may generate a transformation curve based on one or more transformation curve segments. The transformation curve may illustrate the relationship between the gray levels of elements in a target image (or sub-image) before gray level transformation (e.g., the gray level transformation performed by gray level transformation unit 203-1) and after gray level transformation (e.g., the gray level transformation performed by gray level transformation unit 203-1).

First update unit 505 may update gray level(s) of one or more elements of the target image based on the transformation curve. In some embodiments, first update unit 505 may transform gray levels of a predetermined range. In some embodiments, first update unit 505 may compress or amplify the gray levels within the predetermined range. For example, first update unit 505 may amplify the gray level of 200 to 300, and thus, the gray level of an element whose original gray level is 200 may be changed to 300. As another example, first update unit 505 may diminish the gray level of 200 to 100, and thus, the gray level of an element whose original gray level is 200 may be changed to 100.

FIG. 5-B is a flowchart of an exemplary process for transforming gray levels of an image according to some embodiments of the present disclosure. As shown in FIG. 5-B, the process may include determining a characteristic curve 511, dividing a characteristic curve 512, determining transformation curve segments 513, generating a transformation curve 514 based on the determined transformation curve segments, and updating the gray levels of elements based on the transformation curve 515.

In 511, a characteristic curve may be determined based on a target image. Operation 511 may be performed by characteristic curve determination unit 501. In some embodiments, an ROI may be extracted as the target image. In some embodiments, a high frequency sub-image or a low frequency sub-image may be designated as the target image. A reference edge may be determined in the target image. In some embodiments, an ROI edge may be determined as the reference edge. In some embodiments, the outer edge of the entire target image may be determined as the reference edge. In some embodiments, the reference edge may be determined automatically, semi-automatically, or manually. For example, a user may artificially define the reference edge through a GUI of the input/output device 150. For an element of the target image, the distance to each element of the reference edge may be calculated. In some embodiments, a line with minimum distance may be determined for each of a plurality of elements of the target image. In some embodiments, the value of the minimum distance may be expressed by the number of elements in the line with minimum distance. In some embodiments, one or more elements of the target image may have the same value of the minimum distance. A gray level corresponding to a minimum distance D may be the average gray level of the gray levels of the elements having the same or similar value of the minimum distance D. For instance, the gray level corresponding to the minimum distance D may be determined by dividing the sum of gray levels of the elements having the same or similar value of the minimum distance D by the number of these elements. For example, a minimum distance 1.5 cm (or a number of elements, e.g., 110, 115, 117, 120, etc.) may correspond to element a, element b, and element c. The gray level corresponding to 1.5 cm (or a number of elements, e.g., 110, 115, 117, 120, etc.) may be calculated by dividing the sum of gray levels of element a, element b, and element c by 3.

In 512, the characteristic curve determined in 511 may be divided into N characteristic curve segments. Operation 512 may be performed by characteristic curve division unit 502. In some embodiments, the gray levels of the elements of the reference edge may be similar to that of a background. In some embodiments, one or more elements of the reference edge and its neighborhood may have a higher gray level than one or more elements of the interior region. In order to reduce the difference in the gray levels of the elements between the reference edge, as well as the neighborhood of the reference edge, and the interior region, the gray levels of the elements of the reference edge and its neighborhood may be diminished. In some embodiments, the reference edge and its neighborhood may have a lower gray level than the interior region. In order to reduce the difference in the gray level between the reference edge, as well as the neighborhood of the reference edge, and the interior region, the gray levels of the elements of the reference edge and its neighborhood may be increased.

In some embodiments, a gray level range may be determined before the characteristic curve is divided into characteristic curve segments. By way of example in which the gray levels of the elements of the reference edge and its neighborhood is diminished, the maximum value of the gray level range may be determined as the maximum gray level of the elements of the reference edge (as illustrated as point A in FIG. 7) before the gray levels of elements of the reference edge are modified. In some embodiments, the minimum value of the gray level range may be determined based on individual applications of the technique. In some embodiments, the maximum value of the gray level range and/or the minimum value of the gray level range may be adjusted based on a processing efficiency of the image processing system 130. In some embodiments, the minimum gray level may be a gray level corresponding to a predetermined distance in the characteristic curve. For example, the predetermined distance may be 2 cm. If the demand is to transform the gray values of elements that are located within a predetermined distance from the reference edge, the minimum value of the gray level range may be determined as the corresponding gray level of the predetermined distance according to the characteristic curve (as illustrated as point P in FIG. 7). In some embodiments, the minimum value of the gray level range may be predetermined automatically, semi-automatically, or manually. For example, a user may define the minimum value through a GUI of the input/output device 150. As another example, a user may define the minimum value by specifying a distance from the reference edge through a GUI of the input/output device 150.

In some embodiments, after determining the gray level range, the portion of characteristic curve within the gray level range may be divided into N segments. The number (N) of segments may be determined based on the number of gray levels greater than the minimum value of the determined gray level range. In some embodiments, as the gray level corresponding to a distance may be determined as the average gray level of the elements with the same distance, the gray levels in the characteristic curve may be discrete data points. That is, the number N may be a definite number. For example, if the minimum value of the gray level range is determined to be 200, the gray levels greater than 200 may include 300, 400, 500, 600, and 700. Thus, the number of gray levels greater than 200 is 5, and the characteristic curve may be divided into 5 segments, according to the number of gray levels.

In 513, transformation curve segments may be determined based on the divided N characteristic curve segments generated in 512. Operation 513 may be performed by transformation curve segment determination unit 503. In some embodiments, a transformation curve segment may correspond to a characteristic curve segment. In some embodiments, the transformation curve segments may be determined one by one. In some embodiments, a second transformation curve segment may be determined based on a previously determined first transformation curve segment. In some embodiments, the order for determining different transformation curve segments may be based on the gray level range of different characteristic curve segments. For example, the characteristic curve segment with a relatively high gray level range may be first used to determine its corresponding transformation curve segment, and then the characteristic curve segment with a relatively low gray level range may be used to determine its corresponding transformation curve segment. As another example, the characteristic curve segment with a relatively low gray level range may be first used to determine its corresponding transformation curve segment, and then the characteristic curve segment with a relatively high gray level range may be used to determine its corresponding transformation curve segment. In some embodiments, the slope of a transformation curve segment may be determined based on the corresponding characteristic curve segment(s).

Figure 7:
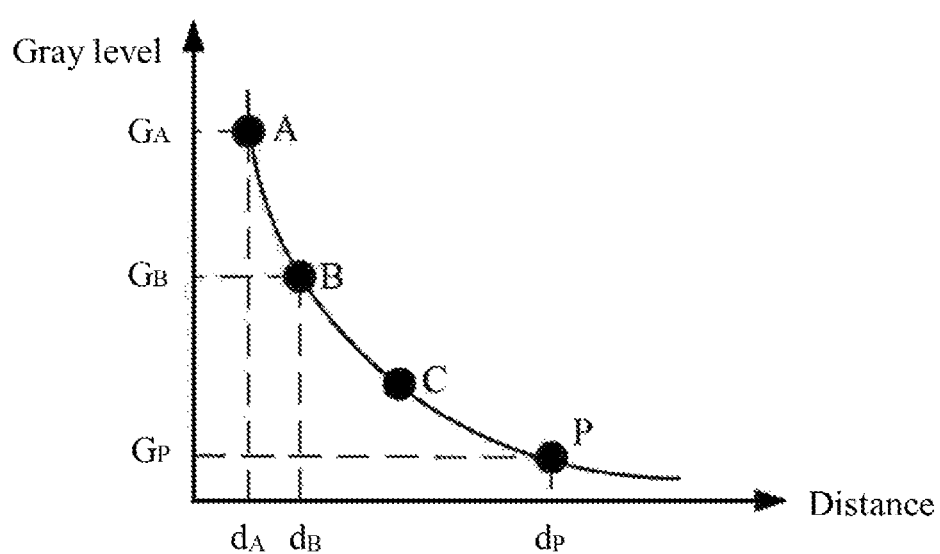
FIG. 7 is a schematic diagram illustrating an exemplary characteristic curve segmented into a plurality of characteristic curve segments according to some embodiments of the present disclosure.

FIG. 7 illustrates an exemplary characteristic curve segmented into a plurality of characteristic curve segments. Referring to FIG. 7, the gray levels of the characteristic curve segments (from point A to a predetermined point P) may be within the range of $[G_A, G_P]$, in which $G_A$ may represent the gray level corresponding to the distance of point A in the figure, and $G_P$ may represent the gray level corresponding to the distance of point P in the figure. $G_A$ may represent the maximum gray level of the characteristic curve segments, while $G_P$ may represent the minimum gray level of the characteristic curve segments. As illustrated, the characteristic curve may be segmented into three characteristic curve segments, including segments AB, BC, and CP. The transformation curve segment corresponding to segment AB may be first determined, and then segment BC, and segment CP, or vice versa. It should be noted that the number of segments is merely for illustration purposes and not intended to limit the scope of the present disclosure.

Referring to the characteristic curve segment AB, the slope of a transformation curve segment A'B' corresponding to characteristic curve segment AB may be determined based on the gray level of point P in the characteristic curve, and the gray levels of point A and point B in characteristic curve segment AB. For instance, the slope of the transformation curve segment A'B' may be determined as the ratio of the gray level of point P in the characteristic curve to an average of the gray levels of point A and point B in characteristic curve segment AB, as illustrated in Equation 1:

$$K_{A'B'} = \frac{2G_P}{G_A + G_B}, \qquad (1)$$

wherein $K_{A'B'}$ may be the slop of transformation curve segment A'B', $G_P$ may be the gray level of point P, $G_A$ may be the gray level of point A, and $G_B$ may be the gray level of point B. The slopes of other transformation curve segments (e.g., segment B'C' corresponding to characteristic curve segment BC, segment C'P' corresponding to characteristic curve segment CP, etc.) may be calculated in a similar way as segment A'B'. In some embodiments, the starting point of the transformation curve segment A'B' may be determined as point A'. In some embodiments, point A' may have the same gray level as point A in the characteristic curve. In some embodiments, the transformation curve segment A'B' may be determined based on the slope $K_{A'B'}$ and the gray level of point A'.

With respect to transformation curve segment B'C' corresponding to characteristic curve segment BC, the slope of segment B'C' may be determined similar to how the slope of segment A'B' corresponding to characteristic curve segment AB is determined. In some embodiments, the starting point of the transformation curve segment B'C' may be determined as point B'. The gray level of point B' may be determined according to Equation (2):

$$G_{B'} = G_{A'} - \frac{d_A - d_B}{d_A - d_P}(G_A - G_P), \quad (2)$$

wherein $G_{B'}$ may be the gray level of point B', $G_{A'}$ may be a gray level of point A', $d_A$ may be the distance of starting point (point A) in the characteristic curve segment AB, $d_B$ may be the distance of end point (point B) in the characteristic curve segment AB, $d_P$ may be the distance of predetermined point P, $G_A$ may be the gray level of starting point (point A) of the characteristic curve segment AB, and $G_P$ may be the gray level of the predetermined point P. In some embodiments, the transformation curve segment B'C' may be determined based on the slope KB'c' and the gray level of point B' (i.e., $G_{B'}$). Accordingly, each transformation curve segment corresponding to a characteristic curve segment may be determined as described above.

In some embodiments, the slope of Nth transformation curve segment may be a ratio of the gray level of a predetermined point P in a characteristic curve to an average gray level of the starting point and end point of Nth characteristic curve segment. The gray level of the starting point of the Nth transformation curve segment may be the sum of gray level of the starting point in (N−1)th transformation curve segment and the gray level variation of the corresponding (N−1)th characteristic curve segment. The gray level variation of the corresponding (N−1)th characteristic curve may refer to the gray level variation of the starting point and the end point of the (N−1)th characteristic curve. The gray level of the starting point of the Nth transformation curve segment may be determined according to Equation (2), in which $G_{B'}$ may correspond to the gray level of the starting point of the Nth transformation curve segment, $G_{A'}$ may correspond to the gray level of the starting point of the (N−1)th transformation curve segment, $d_A$ may correspond to the distance of starting point in the (N−1)th characteristic curve segment, $d_B$ may correspond to the distance of end point in the (N−1)th characteristic curve segment, $d_P$ may correspond to the distance of predetermined point P, $G_A$ may correspond to the gray level of starting point of the (N−1)th characteristic curve segment, and $G_P$ may correspond to the gray level of the predetermined point P.

In some embodiments, in 513, the point with the minimum value (determined in 512) of the gray level range (e.g., predetermined point P) may be designated as the starting point. In some embodiments, as illustrated in FIG. 7, point P may be designated as the starting point of segment CP, point C may be designated as the starting point of segment BC, and point B may be designated as the starting point of segment AB. Accordingly, the starting point for transformation curve segment C'P' may be designated as point P', the starting point for transformation curve segment B'C' may be designated as point C', and the starting point for transformation curve segment A'B' may be designated as point B'. In some embodiments, the gray level of point P' may be the same as that of point P, and the gray level for point C' and B' may be determined based on Equation (2). For example, the gray level of point C' may be determined according to Equation (3):

$$G_{C'} = G_{P'} + \frac{d_P - d_C}{d_P - d_A}(G_A - G_P), \quad (3)$$

wherein $G_{C'}$ may be the gray level of starting point C', $G_{P'}$ may be the gray level of point P', $d_P$ may be the distance of starting point P in the characteristic curve segment CP, $d_C$ may be the distance of end point C in the characteristic curve segment CP, $d_A$ may be the distance of point A, $G_P$ may be the gray level of point P of the characteristic curve segment CP, and $G_A$ may be the gray level of point A in the characteristic curve segment.

In some embodiments, the slope of transformation curve segment C'P', and segment B'C' may be determined according to Equation (1). The transformation curve segment C'P' corresponding to segment CP may be determined based on the gray level of point P' and the slop of C'P'. Accordingly, the transformation curve segment B'C' and segment A'B' may be so determined.

In 514, a transformation curve may be generated based on the transformation curve segments determined in 513. Operation 514 may be performed by transformation curve generating unit 504. In some embodiments, a transformation curve may be generated by curve fitting based on the determined transformation curve segments. In some embodiments, a transformation curve may be generated using one or more fitting techniques including, for example, a least square technique, a Lagrange interpolation technique, a Newton iteration technique, a cubic spline interpolation technique, or the like, or any combination thereof. For example, the transformation curve may be generated by curve fitting based on a Lagrange interpolation technique. In some embodiments, the transformation curve may be used for updating gray levels of the elements in the target image.

In 515, gray levels of one or more elements in the target image may be updated. Operation 515 may be performed by first update unit 505. In some embodiments, gray levels may be updated based on the transformation curve generated in 514. In some embodiments, the gray levels of elements whose gray levels are within the gray level range determined in 512 may be updated. In some embodiments, according to the transformation curve, the gray levels may be compressed or amplified. In some embodiments, the transformation curve may be used to compress or amplify the gray levels of the reference edge in a low frequency sub-image and/or a high frequency sub-image. In some embodiments, after updating, the gray levels of the elements in the gray level range may be revised (diminished, or increased). In some embodiments, the revision effect may be linear or nonlinear. In some embodiments, the transformation curve may be used to revise the gray level of an element whose distance from the reference edge is within a predetermined range. In some embodiments, by adjusting a proper gray level range determined in 512, the gray levels of the elements of background in the target image may be not updated. In some embodiments, after updating, the ROI edge may be distinguished from the background.

In some embodiments, the gray levels of one or more elements of a target image may be compressed based on a transformation curve. The transformation curve may be determined based on a positive image, in which the gray levels of the elements of background may be higher than that of region of interest. In some embodiment, the minimum value of the gray level range of the transformation curve may be the gray level of a predetermined point. The maximum value of the gray level range of the transformation curve may be a maximum gray levels of the elements of the reference edge. In some embodiments, the number (N) of segments may be determined based on the number of gray levels greater than or equal to the minimum value of the gray level range.

In some embodiments, the gray levels of one or more elements of a target image may be amplified based on a transformation curve. The transformation curve may be determined based on a negative image, in which the gray levels of the elements of background may be lower than that of region of interest. After being amplified based on the transformation curve, the gray levels of one or more elements of the negative image may be higher than that before transformation. For example, the gray levels of one or more elements of a reference edge may be amplified. The gray levels of elements of the background may not be adjusted. Hence, the contrast between the reference edge and the background may be enhanced. The enhanced contrast may facilitate a user (e.g., a doctor) to distinguish the region of interest and the background.

By way of example in which the transformation curve is used for amplifying the gray levels of one or more elements of a target image, the gray level of a starting point and a slope of a transformation curve segment may be determined according to Equation (1), Equation (2), and/or Equation (3). In some embodiments, the minimum value of the gray level range of the transformation curve may be the minimum gray level of the elements of the reference edge. The maximum value of the gray level range of the transformation curve may be the gray level of a predetermined point. In some embodiments, the number (N) of segments may be determined based on the number of gray levels lower than or equal to the maximum value of the gray level range.

FIG. 6 is a schematic diagram illustrating an exemplary characteristic curve according to some embodiments of the present disclosure. As described above, the characteristic curve may express the relationship between the distance and the corresponding gray level. In some embodiments, the distance may be expressed by the number of elements between an element in the target image and the reference edge of the target image. The horizontal axis of the characteristic curve may represent minimum distances between a plurality of elements of the target image and the reference edge. The minimum distances are shown as the number of elements. The vertical axis of the characteristic curve may represent the corresponding average gray level of one or more elements that may have the same distance. It is understood that the specific characteristic curve shown in FIG. 6 are for illustration purposes, and not intended to limit the scope of the present disclosure. The characteristic curve shown in FIG. 6 may be determined from a low frequency sub-image. According to the characteristic curve, the gray levels corresponding to different distances may be determined.

FIG. 7 is a schematic diagram illustrating an exemplary characteristic curve segmented into a plurality of characteristic curve segments according to some embodiments of the present disclosure. As shown in FIG. 7, the characteristic curve may be divided into characteristic curve segments. In some embodiments, the gray levels shown in the vertical axis may be discrete, and the continuous curve is an approximation merely for illustration purposes. In FIG. 7, a point P may be predetermined. The gray level range (within which gray levels may be transformed) may be determined as $[G_P, G_A]$, in which $G_P$ may represent the lower limit of the gray level range, and $G_A$ may represent the upper limit of the gray level range. The characteristic curve within the range $[G_P, G_A]$ may be divided into 3 segments: segment AB, segment BC, and segment CP. It should be noted that the number of segments shown in FIG. 7 is merely for illustration purposes and not intended to limit the scope of the present disclosure.

FIG. 8 is a schematic diagram illustrating an exemplary transformation curve according to some embodiments of the present disclosure. FIG. 8 illustrates the gray level ranges within which gray levels may be transformed. $G_P$ may be the minimum value of the gray level range, and $G_P$ may correspond to the gray level of the predetermined point P shown in the FIG. 7. $G_A$ may be the maximum value of the gray level range, and $G_A$ may correspond to the gray level of point A in FIG. 7. The transformation curve P'A' shown in FIG. 8 may be determined based on the characteristic curve PA shown in FIG. 7. The transformation curve P'A' may illustrate a revision effect on gray levels. The transformation curve exemplified in FIG. 8 indicates that the gray level within $[G_P, G_A]$ may be reduced by way of the transformation.

FIG. 9-A is a schematic diagram illustrating an exemplary weight transformation unit 203-2 according to some embodiments of the present disclosure. The weight transformation unit 203-2 may include a weight image determination unit 901 and a second update unit 902.

The weight image determination unit 901 may determine a weight image for a target image (or sub-image). The target image (or sub-image) may refer to an image (or sub-image) to be processed or being processed by the image processing system 130. The target image (or sub-image) may include a high frequency sub-image, a low frequency sub-image, a gray level image, a color image, or the like. In some embodiments, the weight image determination unit 901 may generate a weight image based on the target image (or sub-image). In some embodiments, the weight image determination unit 901 may acquire a weight image from the storage 140, or an external data storage device via the network 160. The weight image may refer to a 2D image or 3D image in which the value of each element may represent a weighting factor for the corresponding element of the target image (or sub-image). In some embodiments, the weight image may have the same size as the target image (or sub-image). In some embodiments, the value of the element in a position in the weight image may be the weighting factor for an element in a corresponding position in the target image (or sub-image). For example, the weighting factor for an element at the position (x, y) or a voxel at the position (x, y, z) of the target image (or sub-image) may be the value of the element at the position (x, y) or the voxel at the position (x, y, z) of the weight image.

The second update unit 902 may update the value(s) of one or more elements of the target image (or sub-image) by the image processing system 130. The value of an element may refer to information of the element including, for example, the gray level, brightness, color, or the like, or any combination thereof. In some embodiments, the second update unit 902 may update the value(s) of one or more elements based on the weight image determined by the weight image determination unit 901. In some embodiments, the second update unit 902 and the first update unit 505 may be integrated into a single update unit that have the function of both units.

FIG. 9-B is a flowchart illustrating an exemplary process for transforming a target image based on a weight image according to some embodiments of the present disclosure. As illustrated herein, an exemplary process for transforming a target image based on a weight image may include determining a weight image, and updating the target image based on the weight image.

In 911, a weight image may be determined based on a target image (or sub-image). The weight image determination 911 may be performed by the weight image determination unit 901. In some embodiments, a weight image may be determined based on the gray levels of the elements of the target image (or sub-image). In some embodiments, the target image (or sub-image) may include a first class of elements and/or a second class of elements. In some embodiments, the first class of elements may refer to noise elements in the target image, while the second class of elements may refer to other elements in the target image excluding the noise elements. The noise elements may refer to pixels/voxels with noise including, for example, a Gaussian noise, a salt-and-pepper noise, a shot noise, a quantization noise, a film grain noise, an anisotropic noise, or the like, or any combination thereof. Other elements may refer to pixels/voxels in the target image excluding the noise pixels/voxels. In some embodiments, elements with different gray levels may have different weighting factors. In some embodiments, weighting factors of elements with different gray levels may be determined by different techniques. For example, the first class of elements may have lower gray levels than the second class of elements, and the weighting factors for the first class of elements may be determined using a different technique than the second class of elements. In some embodiments, weight image determination unit 901 may determine a gray level range of the first class of elements in the target image (or sub-image). In some embodiments, weight image determination unit 901 may adjust the determined gray level range of the first class of elements in the target image (or sub-image) may. In some embodiments, weight image determination unit 901 may determine a gray level range of the second class of elements in the target image (or sub-image). In some embodiments, if the determined gray level range of the first class of elements is adjusted, the gray level range of the second class of elements may be adjusted correspondingly. For example, for a target image with a gray level range of $[G_1, G_N]$ in which the gray level range of the first class of elements is determined as $[G_1, G_x]$, and the gray level range of the first class of elements is determined as $[G_x, G_N]$, if the gray level range of the first class of elements is adjusted to $[G_1, G_x/2]$, the gray level range of the first class of elements may be adjusted to $[G_x/2, G_N]$ correspondingly. In some embodiments, the gray level range of the first class of elements may be mapped into a first range. The gray level range of the second class of elements may be mapped into a second range. FIG. 9-C illustrates an exemplary procedure for determining a weight image.

In 912, the target image (or sub-image) may be updated based on the weight image determined in 911. The target image (or sub-image) updating in 912 may be performed by the second update unit 902. In some embodiments, the target image (or sub-image) may be updated based on the product of the gray levels of the elements of the target image (or sub-image) and the corresponding weighting factor of the weight image. In some embodiments, the updating in 912 may be carried out element by element. For example, the value of an element (x, y) (or (x, y, z)) of the target image (or sub-image) may be updated by the product of the value itself and the weighting factor of the same element (x, y) (or (x, y, z)) of the weight image.

In some embodiments, a high frequency sub-image of an image layer as illustrated in FIG. 4-B and/or FIG. 4-C may be transformed based on a weight transformation. First, a weight image may be determined based on the high frequency sub-image in 911. Second, the high frequency sub-image may be updated based on the determined weight image obtained in 912. In some embodiments, an image reconstruction operation may be added after 912. For example, the updated high frequency sub-image and the corresponding low frequency sub-image may be used for reconstruction, and a transformed image (or image layer) may be obtained.

FIG. 9-C is a flowchart illustrating an exemplary process for determining a weight image according to some embodiments of the present disclosure. In 921, gray level range of the first class of elements in a target image (or sub-image) may be determined. Operation 921 may be performed by the weight image determination unit 901. In some embodiments, the target image (or sub-image) may refer to a high frequency sub-image, a low frequency sub-image, a gray level image, a color image, or the like. In some embodiments, the gray level range of the first class of elements may be determined according to a gray level threshold. The gray level threshold may be used for distinguishing the first class of elements and the second class of elements. In some embodiments, the gray level threshold may be determined according to a default setting of the image processing system 130. For example, the gray level threshold may be pre-stored in the storage 140, and the weight image determination unit 901 may retrieve the gray level threshold from the storage 140 in 921. In some embodiments, the gray level threshold may be determined manually or semi-manually. For example, a user may determine the gray level threshold through a graphical user interface in the input/output device 150 by inputting or selecting a threshold from a list suggested by the image processing system 130.

In some embodiments, the gray level threshold may be determined according to one or more gray levels of the target image (or sub-image). In some embodiments, the gray level threshold may be determined based on the average gray level of the elements of the entire or a portion of the target image, $G_{average}$. For instance, the average gray level $G_{average}$ may be obtained by dividing the sum of gray levels of all the elements in the target image by the number of all the elements in the target image. In some embodiments, the gray level threshold may be determined based on a modified average gray level. For example, the gray level threshold may equal to the average gray level $G_{average}$ multiplied by a pre-determined coefficient k. In some embodiments, the coefficient k may be determined according to the gray level difference between an edge (e.g., an ROI edge, an edge with higher contrast than a background, an edge of the entire target image, etc.) and the first class of elements of the target image. Merely by way of example, the pre-determined coefficient k may be set within a range of [1, 3] (e.g., k=3). It should be noted that the exemplary range of coefficient k is provided merely for illustration purposes and not intended to limit the scope of the present disclosure.

In some embodiments, the gray level range of the first class of elements may be determined according to the gray level threshold. In some embodiments, in a high frequency sub-image, the first class of elements may have gray levels lower than the second class of elements, and an element whose gray level is lower than the gray level threshold (e.g., $G_{average}$ itself or $G_{average}$ multiplied by the pre-determined coefficient k) may be regarded as the first class of elements (e.g., noise elements). For example, the elements whose gray levels fall within the range of [0, k×$G_{average}$] may be regarded as belonging to the first class.

In 922, the gray level range of the first class of elements in target image (or sub-image) may be modified. Operation 922 may be performed by the weight image determination unit 901. In some embodiments, for example, in a high frequency sub-image, one or more regions of the target image (or sub-image) may have elements with weak details. In some embodiments, the elements with weak details may refer to elements or regions of the target image that have a relatively high noise level. In some embodiments, the gray level range of the elements with weak details may partially overlap with that of the first class of elements. In some embodiments, the overlapping gray level range may be narrow, and it may induce difficulties in determining a modified gray level threshold for distinguishing the first class of elements and the elements with weak details. In some embodiments, the gray level range (e.g., [0, k×$G_{average}$]) of the first class of elements may be modified by revising the gray level range (e.g., [0, k×$G_{average}$]). In some embodiments, revision may refer to stretching or compressing the gray level range. The revision may include a linear revision, and/or a nonlinear revision. In some embodiments, weight image determination unit 901 may use one or more functions (e.g., a sine function, a logarithmic function, etc.) to nonlinearly revise the gray level range (e.g., [0, k×$G_{average}$]). In some embodiments, after revision, a revised gray level range (e.g., a revised [0, k×$G_{average}$]) may be obtained.

In 923, the gray level range of the first class of elements and/or that of the second class of elements may be adjusted based on the revised gray level range obtained in 922. Operation 923 may be performed by the weight image determination unit 901. In some embodiments, a first threshold may be determined based on the revised gray level range of the first class of elements (e.g., the revised [0, k×$G_{average}$]). For example, the first threshold may be determined as the average gray level of the first class of elements within the revised gray level range (e.g., the revised [0, k×$G_{average}$]). The first threshold may be regarded as an updated gray level threshold used for distinguishing the first class of elements and the second class of elements. Then the gray level range of the first class of elements and the gray level range of the second class of elements may be adjusted. For instance, the gray level range of the first class of elements may be [0, the first threshold], and the gray level range of the second class of elements may be (the first threshold, a second threshold]. The second threshold may refer to the maximum gray level within the target image (or sub-image). In some embodiments, the elements whose gray levels equal to the first threshold may be deemed to belong to the first class. In some embodiments, the elements whose gray levels equal to the first threshold may be deemed to belong to the second class. In the following description, it is assumed that the elements whose gray levels equal to the first threshold may be deemed to belong to the first class. This assumption and the corresponding description are for illustration purposes and not intended to limit the scope of the present disclosure.

In 924, weighting factors for the first class of elements may be determined based on the gray level range (e.g., [0, the first threshold]) of the first class of elements adjusted in 923. Operation 924 may be performed by the weight image determination unit 901. In some embodiments, the adjusted gray level range [0, the first threshold] may be mapped into the range of [0, 1]. The mapping process may be performed based on one or more linear or nonlinear algorithms. A linear mapping process may be based on one or more linear algorithms. For example, all the gray levels within the gray level range [0, the first threshold] may be divided by the first threshold, and thus the gray level range [0, the first threshold] may be mapped into [0, 1]. A nonlinear mapping process may be based on one or more nonlinear algorithms including, for example, a sine function, a logarithmic function, or the like, or any combination thereof. In some embodiments, the mapped range [0, 1] may be defined as the weighting factors for the first class of elements. That is, a gray level $G_x$ ($G_x \in$[0, the first threshold]) may be transformed as G; ($G_x' \in$[0, 1]) after mapping, and the value $G_x'$ may be defined as the weighting factors for the first class of elements with a gray level $G_x$.

In 925, weighting factors for the second class of elements may be determined based on the gray level range (e.g., (the first threshold, the second threshold]) of the second class of elements adjusted in 923. Operation 925 may be performed by the weight image determination unit 901. In some embodiments, the adjusted gray level range (the first threshold, the second threshold] may be mapped into the range of (1, G]. The mapping process may be performed based on one or more linear or nonlinear algorithms. A linear mapping process may be based on one or more linear algorithms. A nonlinear mapping process may be based on one or more nonlinear algorithms including, for example, a sine function, a logarithmic function, or the like, or any combination thereof. In some embodiments, the mapped range (1, G] may be defined as the weighting factors for the second class of elements. That is, a gray level $G_y$ ($G_E \in$(the first threshold, the second threshold]) may be transformed as $G_y'$ ($G_y' \in$(1, G]) after mapping, and the value $G_y'$ may be defined as the weighting factors for the second class of elements with a gray level $G_y$. In some embodiments, the value of G may be determined or selected according to a desired image enhancement effect. For example, G may be determined as 2, 3, etc. It should be noted that the value of G is merely for illustration purposes and not intended to limit the scope of the present disclosure.

In 926, the gray levels of the elements within the adjusted gray level range of the first class of elements obtained in 923 may be modified. Operation 926 may be performed by the weight image determination unit 901. In some embodiments, gray levels of the first class of elements may be modified based on corresponding weighting factors defined in 924. Merely by way of example, the gray levels of the first class of elements may be replaced by the corresponding weighting factors.

In 927, the gray levels of the elements within the adjusted gray level range of the second class of elements obtained in 923 may be modified. Operation 927 may be performed by the weight image determination unit 901. In some embodiments, gray levels of the second class of elements may be modified based on corresponding weighting factors defined in 925. Merely by way of example, the gray levels of the second class of elements may be replaced by the corresponding weighting factors.

In 928, a weight image may be generated. Operation 928 may be performed by the weight image determination unit 901. In some embodiments, weight image may be generated based on gray levels of the first class of elements modified in 926, and gray levels of the second class of elements modified in 927. Merely by way of example, after modification process in 926 and 927, the target image (or sub-image) may become a weight image spontaneously. In some embodiments, 926 and 927 may be omitted, and a weight image may be generated based on the weighting factors of the first class of elements and the second class of elements and the respective positions of these weighting factors. For example, a first class of element may have a position (m, n) in the target image (or sub-image), and an adjusted gray level $G_x$ ($G_x \in$ [0, the first threshold]), then a weighting factor $G_x'$ ($G_x' \in$ [0, 1]) may be given to the element at the same position (m, n) in the weight image. As another example, another element may have a position (m', n') in the target image (or sub-image), and an adjusted gray level $G_y$ ($G_y \in$ (the first threshold, the second threshold]), then a weighting factor $G_y'$ ($G_y' \in$ (1, G]) may be given to the element at the same position (m', n') in the weight image.

It should be noted that the above description about the weight transformation unit 203-2 and relevant flowchart is merely an example, and should not be understood as the only embodiment. To those skilled in the art, after understanding the basic principles of the connection between different units/operations, the units/operations and connection between the units/operations may be modified or varied without departing from the principles. The modifications and variations are still within the scope of the current application described above. For example, the 924 and 925 may be performed simultaneously, or integrated into one operation. As another example, 926 and 927 may be omitted. As still another example, 922 and 923 may be integrated into one operation. As a further example, 924 and 926 may be integrated into one operation. As still a further example, 925 and 927 may be integrated into one operation.

Figure 10:
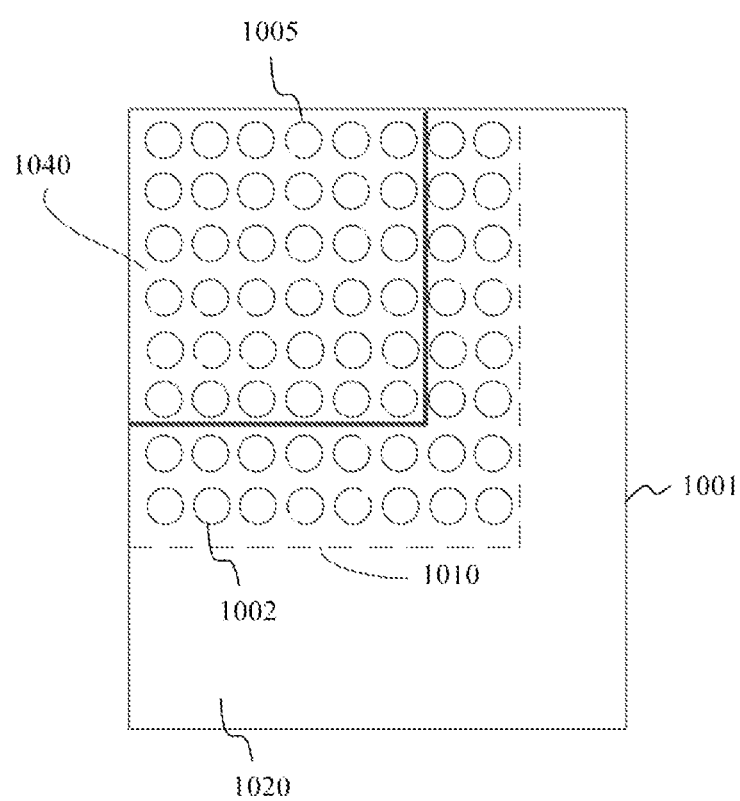
FIG. 10 is a schematic diagram illustrating an exemplary process for generating a weight image.

FIG. 10 is a schematic diagram illustrating an exemplary process for generating a weight image. A target image 1001 (e.g., a high frequency sub-image) may have a plurality of the first class of elements 1002 as illustrated by the hollow circle(s) in region 1010. Region 1010 may refer to the region of the first class of elements 1002 within the gray level range determined in 921. The region excluding region 1010 may refer to the region of the second class of elements. See region 1020 within 1001 but outside of region 1010. Suppose the gray level range of the first class of elements 1002 in region 1010 is [0, 100], after a nonlinear revision process as described in 922, the gray level range of the first class of elements 1002 in region 1010 may be revise to be [0, 200]. Suppose the average gray level of the first class of elements 1002 in region 1010 is 150, designated as the first threshold, after an adjustment process in 923, the gray level range of the first class of elements 1002 may be adjusted as [0, 150], and the gray level range of the second class of elements may be adjusted as (150, the second threshold]. The first class of elements 1005 in region 1040 whose gray levels are within the range [0, 150] may be regarded as real first class of elements. The gray level range [0, 150] may be mapped into [0, 1] in 924. For example, all the gray levels within the range [0, 150] may be divided by 150. The values within the mapped range [0, 1] may represent the weighting factors of the first class of elements 1005 in region 1040. The gray level range (150, the second threshold] may be mapped into (1, G] in 925. The values within the mapped range (1, G] may represent the weighting factors of the second class of elements of the target image 1001 excluding region 1040. In some embodiments, the value of G may be determined based on the second threshold. In some embodiments, the second threshold may refer to the maximum gray level within the target image 1001. In some embodiments, the value of G may be determined or selected according to a desired image enhancement effect. For example, G may be determined as 2, 3, etc. It should be noted that the value of G is merely for illustration purposes and not intended to limit the scope of the present disclosure. The values within the mapped range (1, G] may represent the weighting factors of the second class of elements excluding the first class of elements 1005 in region 1040. By replacing the gray levels of the first class of elements 1005 in region 1040 with the corresponding weighting factors in the range [0, 1], and replacing gray levels of the second class of elements excluding the first class of elements 1005 in region 1040 with the corresponding weighting factors in the range (1, G], a weight image corresponding to the target image 1001 may be obtained. The weight image may illustrate the weighting factor of each element in the target image 1001.

FIG. 11-A is a flowchart of an exemplary process for reconstructing a composite image based on one layer of a target image according to some embodiments of the present disclosure. The reconstruction process may include acquiring sub-image(s) 1101, and reconstructing composite image 1102.

In 1101, a low frequency sub-image and a high frequency sub-image of a target image may be acquired. Operation 1101 may be performed by reconstruction block 204. In some embodiments, the low frequency sub-image and/or high frequency sub-image may be generated by decomposition block 202. In some embodiments, the low frequency sub-image and high frequency sub-image may be generated using the same decomposition algorithm. In some embodiments, the low frequency sub-image and high frequency sub-image may be generated using different decomposition algorithms. For instance, the low frequency sub-image may be generated using a first decomposition algorithm, and the high frequency sub-image may be generated using a second decomposition algorithm. For example, the low frequency sub-image may be generated using Laplace transform, while the high frequency sub-image may be generated using wavelet transform.

In some embodiments, the low frequency sub-image and the high frequency sub-image may be generated from the same target image (or sub-image). In some embodiments, the low frequency sub-image and the high frequency sub-image may be generated from the same layer. In some embodiments, the low frequency sub-image and the high frequency sub-image may be generated from different target images (or sub-images) or different layers of the same target image.

In some embodiments, the low frequency sub-image may have been transformed by transformation block 203. In some embodiments, the high frequency sub-image may have been transformed by transformation block 203. For example, the low frequency sub-image and/or the high frequency sub-image may have been transformed based on gray level transformation as illustrated in FIG. 5-B. As another example, the low frequency sub-image and/or the high frequency sub-image may have been transformed based on weight transformation as illustrated in FIG. 9-C. As still another example, the low frequency sub-image and/or the high frequency sub-image may have been enhanced linearly or nonlinearly as illustrated in FIG. 2-A and FIG. 2-B. As a further example, the low frequency sub-image and/or the high frequency sub-image may have been denoised. As still a further example, the low frequency sub-image and/or the high frequency sub-image may have been transformed through one or more interpolation processes (e.g., the sub-image may have been up-sampled by the up-sampling unit 203-4). In some embodiments, the low frequency sub-image and/or the high frequency sub-image may have been transformed through one or more transformation processes illustrated in the present disclosure.

In some embodiments, the (transformed) low frequency sub-image and the (transformed) high frequency sub-image may be acquired from the decomposition block 202, the transformation block 203, the storage 140, the input/output device 150, or an external data storage device via network 160.

In 1102, a composite image may be reconstructed based on the (transformed) low frequency sub-image and the (transformed) high frequency sub-image acquired in 1101. Operation 1102 may be performed by reconstruction block 204. In some embodiments, the composite image reconstructed may correspond to a target image (e.g., an initial image, an ROI of the initial image, an ROI image, any image generated in image processing procedure, or the like, or any combination thereof). In some embodiments, the composite image may be an enhanced target image, a compressed target image, a transformed target image, or the like, or any combination thereof. For example, in comparison with the target image, the composite image may have improved contrast, enhanced details, more distinct edge, or the like, or any combination thereof.

In some embodiments, 1102 may by performed based on one or more reconstruction algorithms. The reconstruction algorithms may include an analytic reconstruction algorithm, an iterative reconstruction algorithm, or the like, or any combination thereof. The analytic reconstruction algorithm may include a filtered back projection (FBP) algorithm, a back projection filtration (BFP) algorithm, a p-filtered layergram, or the like. The iterative reconstruction algorithm may include an ordered subset expectation maximization (OSEM) algorithm, a maximum likelihood expectation maximization (MLEM) algorithm, etc.

In some embodiments, the composite image may be reconstructed by superimposing the (transformed) low frequency sub-image and the (transformed) high frequency sub-image. For example, the gray levels of elements in the (transformed) low frequency sub-image may be added with that of the same elements in the (transformed) high frequency sub-image, and the composite image may be obtained.

In some embodiments, the composite image may be reconstructed based on a reconstruction algorithm corresponding to a decomposition algorithm. For example, if the (transformed) low frequency sub-image and the (transformed) high frequency sub-image are generated using wavelet transform, the composite image may be reconstructed using an inverse wavelet transform. In some embodiments, the composite image may be further used in a subsequent reconstruction process. For example, the composite image generated in 1102 together with a sub-image may be further used for reconstructing a new composite image. In some embodiments, a composite image may be reconstructed based on two or more layers, as shown in FIG. 11-B and FIG. 11-C. In some embodiments, the composite image may be transmitted to image acquisition block 201, decomposition block 202, transformation block 203, storage 140, network 160, or the like, or any combination thereof.

FIG. 11-B is a flowchart of an exemplary process for reconstructing a low frequency sub-image of L'th layer generated from the second decomposition according to some embodiments of the present disclosure. The process may include enhancing sub-image 1111, and reconstructing sub-image 1112. It is understood that the process illustrated in FIG. 11-B may be applicable for reconstructing a low frequency sub-image of L'th layer generated from the first decomposition according to some embodiments of the present disclosure.

In 1111, the high frequency sub-images from (L'+1)th layer to (L'+N)th layer generated from a second decomposition may be enhanced. In some embodiments, the high frequency sub-images may be enhanced based on one or more enhancement techniques. The enhancement techniques may include filtering with a morphological operator, histogram equalization, noise removal using, e.g., Wiener filter techniques, linear or nonlinear contrast adjustment, median filtering, unsharp mask filtering, contrast-limited adaptive histogram equalization (CLAHE), decorrelation stretch, or the like, or any combination thereof. In some embodiments, the enhancement technique may refer to linear/nonlinear enhancement. In some embodiments, the linear enhancement may include a Max-Min contrast technique, a percentage contrast technique, a piecewise contrast technique, or the like, or any combination thereof. The nonlinear enhancement may include histogram equalization, adaptive histogram equalization, a homomorphic filter technique, an unsharp mask, or the like, or any combination thereof. In some embodiments, the enhancement technique may include gray level transformation (as shown in FIG. 5-B), weight transformation (FIG. 9-C), or the like, or any combination thereof. In some embodiments, the high frequency sub-images from (L'+1)th layer to (L'+N)th layer generated from the second decomposition may be enhanced by linear/nonlinear enhancement. For example, the high frequency sub-images of the (L'+1)th layer generated from a second decomposition may be enhanced by the Max-Min contrast technique. In some embodiments, the high frequency sub-images from (L'+1)th layer to (L'+N)th layer may be enhanced using different techniques.

In 1112, the low frequency sub-image of L'th layer generated from the second decomposition may be reconstructed. In some embodiments, the low frequency sub-image of L'th layer generated from the second decomposition may be reconstructed based on the high frequency sub-image from (L'+1)th layer to (L'+N)th layer enhanced in 1111. In some embodiments, the enhanced high frequency sub-image of (L'+N)th layer and the low frequency sub-image of (L'+N)th layer may be used to reconstruct the low frequency sub-image of (L'+N−1)th layer. The reconstructed low frequency sub-image of (L'+N−1)th layer and the enhanced high frequency sub-image of (L'+N−1)th layer may be used to reconstruct the low frequency sub-image of (L'+N−2)th layer. Accordingly, the reconstructed low frequency sub-image of (L'+1)th layer and the enhanced high frequency sub-image of (L'+1)th layer may be used to reconstruct the low frequency sub-image of L'th layer. For example, if L' equals to 3 and N equals to 2, the low frequency sub-image of the fourth layer may be reconstructed based on the low frequency sub-image of the fifth layer and the enhanced high frequency sub-image of the fifth layer; and then the low frequency sub-image of the third layer may be reconstructed based on the reconstructed low frequency sub-image of the fourth layer and the enhanced high frequency sub-image of the fourth layer. In some embodiments, the low frequency sub-image of the L'th layer may be further used to reconstruct a composite image by reconstruction block 204. FIG. 11-C illustrates an exemplary procedure. It should be noted that in some embodiments, in 1111 and/or 1112, the low frequency sub-image from (L'+1)th layer to (L'+N)th layer may be enhanced before and/or after reconstruction.

FIG. 11-C is a flowchart of an exemplary process for reconstructing a composite image based on L layers generated from the first decomposition according to some embodiments of the present disclosure. The process may include 1121 for updating sub-image, one or more operations (e.g., 1122, 1123, etc.) for reconstructing sub-image, and 1124 for reconstructing the composite image. In some embodiments, the first decomposition and corresponding reconstruction may improve detail information of a target image. In some embodiments, the second decomposition and corresponding reconstruction may improve edge information of the target image. Reconstruction using the sub-images of the first decomposition and the sub-images of the second decomposition may correspondingly improve detail information and edge information of the target image, and/or enhance the contrast of the target image. Besides, the artifacts of the target image may be reduced by transforming the sub-images of the first decomposition and/or the second decomposition.

In 1121, the low frequency sub-image of Lth layer generated from the first decomposition may be updated. In some embodiments, the low frequency sub-image of Lth layer may be updated based on the low frequency sub-image of L'th layer generated from the second decomposition (as shown in FIG. 11-B). In some embodiments, the low frequency sub-image of Lth layer generated from the first decomposition may be replaced by the (transformed) low frequency sub-image of L'th layer generated from the second decomposition. In some embodiments, L may be equal to L'. In some embodiments, the sub-images generated from the first decomposition and the sub-images generated from the second decomposition may be derived from the same target image. In some embodiments, the low frequency sub-image of Lth layer may be updated through transformation. In some embodiments, the updated low frequency sub-image of Lth layer may be further transformed. Transformation techniques may include gray level transformation, weight transformation, linear/nonlinear enhancement, up-sampling, or the like, or any combination thereof. For example, the updated low frequency sub-image of Lth layer may be up-sampled using bilinear interpolation. In some embodiments, the updated low frequency sub-image of the Lth layer may be used to reconstruct a low frequency sub-image of (L−1)th layer in 1122.

In 1122, the low frequency sub-image of (L−1)th layer generated from the first decomposition may be updated. In some embodiments, the low frequency sub-image of (L−1)th layer may be reconstructed based on the updated low frequency sub-image of Lth layer and the high frequency sub-image of Lth layer generated from the first decomposition. In some embodiments, the updated low frequency sub-image of Lth layer may be up-sampled by up-sampling unit 203-4. In some embodiments, the updated low frequency sub-image of (L−1)th layer may be further transformed. For example, the low frequency sub-image of (L−1)th layer may be up-sampled by up-sampling unit 203-4.

In 1123, the low frequency sub-image of (L−2)th layer generated from the first decomposition may be updated. In some embodiments, the low frequency sub-image of (L−2)th layer may be reconstructed based on the updated low frequency sub-image of (L−1)th layer and the high frequency sub-image of (L−1)th layer generated from the first decomposition. In some embodiments, the updated low frequency sub-image of (L−2)th layer may be further transformed. For example, the low frequency sub-image of (L−2)th layer may be up-sampled by up-sampling unit 203-4.

Similarly, the low frequency sub-image of first layer generated from the first decomposition may be updated. In some embodiments, the updated low frequency sub-image of first layer may be further transformed. In 1124, a composite image may be reconstructed based on the updated low frequency sub-image of first layer and the high frequency sub-image of first layer generated from the first decomposition.

It should be noted that one or more operations for updating low frequency sub-images of different layers generated from the first decomposition maybe added between 1123 and 1124. In some embodiments, one or more high frequency sub-images of first layer through Lth layer may be transformed before or after an updating operation.

For illustration purposes, an exemplary process may be described below. It should be noted that the description below is merely an example, and should not be understood as the only embodiment. To those skilled in the art, after understanding the basic principles of the operations, flowchart may be modified or varied without departing from the principles. The modifications and variations are still within the scope of the current application described above.

In some embodiments, a target image may be decomposed by Laplace transform into 3 layers, and the target image may be decomposed by wavelet transform into 5 layers. The low frequency sub-image of the third layer generated by Laplace transform may be updated by the low frequency sub-image of third layer generated by wavelet transform.

Merely by way of example, the low frequency sub-image of the fifth layer generated by wavelet transform may be transformed using bilinear interpolation; the high frequency sub-image of the fifth layer generated by wavelet transform may be transformed using nonlinear enhancement. The low frequency sub-image of the fourth layer may be reconstructed based on the transformed low frequency sub-image of the fifth layer and the transformed high frequency sub-image of the fifth layer. The reconstructed low frequency sub-image of the fourth layer may be transformed using bilinear interpolation. The high frequency sub-image of the fourth layer generated by wavelet transform may be transformed using nonlinear enhancement. The low frequency sub-image of the third layer may be reconstructed based on the transformed low frequency sub-image of the fourth layer and the transformed high frequency sub-image of the fourth layer.

The low frequency sub-image of the third layer generated from Laplace transform may be replaced by the reconstructed low frequency sub-image of the third layer generated by wavelet transform. The updated low frequency sub-image of third layer generated by Laplace transform may be further used to update the sub-images of the second layer and the first layer generated by Laplace transform.

Merely by way of example, the updated low frequency sub-image of third layer generated by Laplace transform may be transformed using bilinear interpolation; the high frequency sub-image of third layer generated by Laplace transform may be transformed using nonlinear enhancement. The transformed low frequency sub-image of the third layer and the transformed high frequency sub-image of the third layer may be used to reconstruct a low frequency sub-image of the second layer. The updated low frequency sub-image of the second layer may be transformed using bilinear interpolation. The high frequency sub-image of the second layer generated by Laplace transform may be transformed using nonlinear enhancement. The transformed low frequency sub-image of the second layer and the transformed high frequency sub-image of the second layer may be used to reconstruct a low frequency sub-image of the first layer. The updated low frequency sub-image of the first layer may be transformed using bilinear interpolation. The high frequency sub-image of the first layer generated by Laplace transform may be transformed using nonlinear enhancement. The transformed low frequency sub-image of the first layer and the transformed high frequency sub-image of the first layer may be used to reconstruct a composite image.

In some embodiments, information in the L layers generated by Laplace transform and information in L'+N layers generated by wavelet transform may be combined. The low frequency sub-image of Lth layer generated by wavelet transform may be reconstructed based on low frequency sub-images in subsequent layers and enhanced high frequency sub-images in subsequent layers. The updated low frequency sub-image of the Lth layer generated by Laplace transform and enhanced high frequency sub-image of the first layer through Lth layer may be used to reconstruct an enhanced image. Therefore, details and/or the edges in the target image may be enhanced.

In some embodiments, different interpolation algorithms may be used in the reconstruction of low frequency sub-images of different layers generated by wavelet transform and/or Laplace transform. As a result, the image contrast may be enhanced, and artifacts may be removed from the enhanced image. Hence, the image quality may be improved.

In some embodiments, one or more high frequency sub-images may be updated based on weight transformation. In some embodiments, one or more high frequency sub-images may be enhanced by enhancement unit 203-3, and/or denoised based on a denoising algorithm. For example, a high frequency sub-image of a layer may be denoised using Gaussian filtering. A denoised high frequency sub-image may be used in reconstructing a low frequency sub-image.

It should be noted that the above description regarding image acquisition, image decomposition, image transformation, and image reconstruction is merely for illustration purposes. To those skilled in the art, after understanding the basic principles of the operations, processing procedure may be modified, combined or varied without departing from the principles. The modifications, combinations and variations are still within the scope of the current application described above. An exemplary process are described below.

First, a breast image may be generated from a CT image for a chest. As illustrated in FIG. 3-B, a region of breast may be extracted from the CT image, a breast edge may be extracted from the CT image, and a breast image may be generated based on the region of breast and the breast edge.

Second, the breast image may be decomposed into a low frequency sub-image and a high frequency sub-image. The low frequency sub-image may include information regarding the breast edge.

Third, the low frequency sub-image of the breast image may be transformed using gray level transformation. In some embodiments, during a procedure for generating the CT image for a chest, the breast may be pressed. The thickness of the pressed breast may be non-uniform, and the gray level in the breast image may be uneven. For example, the brightness of elements of a breast edge may be darker than that in a region adjacent to the breast edge. The gray levels of the elements of the breast edge may be close to that of the background. Using the gray level transformation technique illustrated in FIG. 5-B, the image quality of the breast image may be improved. As illustrated in FIG. 5-B, a characteristic curve may be determined based on the low frequency sub-image. In some embodiments, the characteristic curve may be divided into N segments. In some embodiments, transformation curve segments may be determined based on the divided N characteristic curve segments. Then a transformation curve may be generated based on the transformation curve segments. In some embodiments, gray levels of elements in a predetermined region of the low frequency sub-image may be updated based on the transformation curve. The predetermined region may refer to the region within which the distance of elements may be within a predetermined value. The gray levels of in the predetermined region may be close to that in the neighborhood region.

Finally, the updated low frequency sub-image and the high frequency sub-image may be used to reconstruct a composite breast image. The gray levels of elements in the composite breast image may be evened, and the thickness of the breast may be well-proportioned.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities of ingredients, properties such as molecular weight, reaction conditions, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An image processing method implemented on at least one machine each of which has at least one processor and storage, the method comprising:
   acquiring a target image, the target image including a plurality of elements, each of the plurality of elements corresponding to a pixel or a voxel, the target image being generated by an imaging device;
   decomposing the target image into at least one layer, the at least one layer including a low frequency sub-image and a high frequency sub-image;
   generating a weight image for the high frequency sub-image of the at least one layer, the weight image including a plurality of weighting factors corresponding to a plurality of elements of the high frequency sub-image of the at least one layer, wherein the weight image is generated based on gray level ranges determined by a gray level threshold that relates to noise levels of the plurality of elements of the high frequency sub-image;
   updating, based on the weight image, the high frequency sub-image of the at least one layer; and
   reconstructing, based on the updated high frequency sub-image of the at least one layer, and the low frequency sub-image of the at least one layer, a composite image.

2. The method of claim 1, the updating the high frequency sub-image comprising:
   multiplying the gray levels of the high frequency sub-image by corresponding weighting factors of the weight image.

3. The method of claim 1, wherein the decomposing the target image into at least one layer comprises:

decomposing, by a first decomposition algorithm, the target image into L layers, each layer of the L layers including a low frequency sub-image and a high frequency sub-image, L≥1; and decomposing, by a second decomposition algorithm, the target image into L'+N layers, each layer of the L'+N layers including a low frequency sub-image and a high frequency sub-image, L'≥1, and N≥1.

4. The method of claim 3, wherein the reconstructing a composite image comprises:

updating, based on the low frequency sub-image of the L'th layer generated by the second decomposition algorithm, the low frequency sub-image of the Lth layer generated by the first decomposition algorithm; and reconstructing, based on the high frequency sub-images of the L layers generated by the first decomposition algorithm and the updated low frequency sub-image of the Lth layer, the composite image.

5. The method of claim 4, wherein the reconstructing the composite image comprises:

for each of a plurality of iterations, up-sampling the low frequency sub-image of the (L−i)th layer;

updating, based on the up-sampled low frequency sub-image of the (L−i)th layer and the high frequency sub-image of the (L−i)th layer, the low frequency sub-image of the (L−i−1)th layer, 0≤i≤L−1; and reconstructing, based on the updated low frequency sub-image of the first layer and the high frequency sub-image of the first layer, the composite image.

6. The method of claim 4 further comprising:

updating the low frequency sub-image of the L'th layer generated by the second decomposition algorithm based on the low frequency sub-image of the (L'+N)th layer generated by the second decomposition algorithm and the high frequency sub-images of the (L'+1)th layer through the (L'+N)th layer generated by the second decomposition algorithm.

7. The method of claim 1, wherein the high frequency sub-image of the at least one layer includes a first class of elements and a second class of elements referring to other elements, and the generating the weight image comprises:

dividing, based on the gray level threshold, the plurality of elements of the high frequency sub-image into the first class of a first gray level range and the second class of a second gray level range;

determining weighting factors for the first class of elements based on the first gray level range of the first class of elements;

determining weighting factors for the second class of elements based on the second gray level range of the second class of elements; and generating, based on the weighting factors for the first class of elements and the weighting factors for the second class of elements, the weight image.

8. The method of claim 7, wherein the dividing the plurality of elements of the high frequency sub-image into a first class of a first gray level range and a second class of a second gray level range comprises:

determining, based on the gray level threshold, the first-a gray level range of the first class of elements in the high frequency sub-image; and determining, based on the first gray level range of the first class of elements, the second gray level range of the second class of elements in the high frequency sub-image, the determining weighting factors for the first class of elements based on the first gray level range of the first class of elements comprises:

mapping the first gray level range of the first class of elements into [0, 1]; and determining, based on the mapped first gray level range of the first class of elements, weighting factors for the first class of elements, and the determining weighting factors for the second class of elements based on the second gray level range of the second class of elements comprises:

mapping the second gray level range of the second class of elements into (1, G], wherein G is a predetermined value; and determining, based on the mapped second gray level range of the second class of elements, weighting factors for the second class of elements.

9. The method of claim 8, wherein the determining the first gray level range of the first class of elements in the high frequency sub-image comprises:

determining, based on the gray level threshold, an initial gray level range of the first class of elements;

modifying the initial gray level range of the first class of elements; and adjusting, based on the modified gray level range of the first class of elements, the initial gray level range of the first class of elements.

10. The method of claim 9, wherein the adjusting the initial gray level range of the first class of elements comprises:

determining, based on the modified gray level range of the first class of elements, a first threshold; and determining the first gray level range of the first class of elements as [0, the first threshold].

11. The method of claim 10, wherein the determining the second gray level range of the second class of elements in the high frequency sub-image comprises:

determining the second gray level range of the second class of elements in the high frequency sub-image as (the first threshold, a second threshold], the second threshold being a maximum gray level within the high frequency sub-image.

12. The method of claim 9, wherein the modifying the initial gray level range of the first class of elements comprises:

modifying the initial gray level range of the first class of elements nonlinearly.

13. The method of claim 9, wherein the determining an initial gray level range of the first class of elements comprises:

determining the gray level threshold based on an average gray level of the elements of the high frequency sub-image; and determining the initial gray level range as being from 0 to the gray level threshold.

14. The method of claim 13, wherein the gray level threshold is equal to the average gray level of the elements of the high frequency sub-image multiplied by a pre-determined coefficient k.

15. An image processing method implemented on at least one machine each of which has at least one processor and storage, the method comprising:

acquiring a target image, the target image including a plurality of elements, an element corresponding to a pixel or a voxel, the target image being generated by an imaging device;

decomposing, by a first decomposition algorithm, the target image into L layers, each layer of the L layers including a low frequency sub-image and a high frequency sub-image, L≥1;

decomposing, by a second decomposition algorithm, the target image into L'+N layers, each layer of the L'+N layers including a low frequency sub-image and a high frequency sub-image, L'≥1, and N≥1, the second decomposition algorithm being different from the first decomposition algorithm;

updating the low frequency sub-image of the Lth layer generated by the first decomposition algorithm by replacing the low frequency sub-image of the Lth layer generated by the first decomposition algorithm with the low frequency sub-image of the L'th layer generated by the second decomposition algorithm; and reconstructing, based on the high frequency sub-images of the L layers generated by the first decomposition algorithm and the updated low frequency sub-image of the Lth layer generated by the first decomposition algorithm, a composite image.

16. The method of claim 15, wherein the reconstructing a composite image comprises:

for each of a plurality of iterations up-sampling the low frequency sub-image of the (L−i)th layer;

updating, based on the up-sampled low frequency sub-image of the (L−i)th layer and the high frequency sub-image of the (L−i)th layer, the low frequency sub-image of the (L−i−1)th layer, 0≤i≤L−1; and reconstructing, based on the updated low frequency sub-image of the first layer and the high frequency sub-image of the first layer, the composite image.

17. The method of claim 16, wherein the up-sampling the low frequency sub-image of the (L−i)th layer comprises:

up-sampling, based on a bilinear interpolation or a cubic interpolation, the low frequency sub-image of the (L−i)th layer.

18. The method of claim 15, further comprising:

before reconstructing the composite image, enhancing one or more of the high frequency sub-images of the L layers generated by the first decomposition algorithm.

19. The method of claim 15, further comprising:

before updating the low frequency sub-image of the Lth layer generated by the first decomposition algorithm, updating the low frequency sub-image of the L'th layer generated by the second decomposition algorithm, including enhancing one or more of the high frequency sub-images of the L'th layer through the (L'+N)th layer generated by the second decomposition algorithm; and reconstructing, based on the low frequency sub-image of the (L'+N)th layer generated by the second decomposition algorithm and the high frequency sub-images of the L'th layer through the (L'+N)th layer generated by the second decomposition algorithm, the low frequency sub-image of the L'th layer generated by the second decomposition algorithm.

20. A system comprising:

at least one processor, and a storage configured to store instructions, the instructions, when executed by the at least one processor, causing the system to effectuate a method comprising:

acquiring a target image, the target image including a plurality of elements, each of the plurality of elements corresponding to a pixel or a voxel, the target image being generated by an imaging device;

decomposing the target image into at least one layer, the at least one layer including a low frequency sub-image and a high frequency sub-image;

generating a weight image for the high frequency sub-image of the at least one layer, the weight image including a plurality of weighting factors corresponding to a plurality of elements of the high frequency sub-image of the at least one layer, wherein the weight image is generated based on gray level ranges determined by a gray level threshold that relates to noise levels of the plurality of elements of the high frequency sub-image;

updating, based on the weight image, the high frequency sub-image of the at least one layer; and reconstructing, based on the updated high frequency sub-image of the at least one layer, and the low frequency sub-image of the at least one layer, a composite image.

* * * * *